(12) United States Patent
Tagawa et al.

(10) Patent No.: US 11,293,764 B2
(45) Date of Patent: Apr. 5, 2022

(54) PARKING ASSISTANCE DEVICE

(71) Applicant: CLARION CO., LTD., Saitama (JP)

(72) Inventors: Shinya Tagawa, Saitama (JP); Makoto Ishinoda, Saitama (JP); Noriyasu Hasejima, Tokyo (JP)

(73) Assignee: CLARION CO., LTD., Saitama (JP)

( * ) Notice: Subject to any disclaimer, the term of this patent is extended or adjusted under 35 U.S.C. 154(b) by 118 days.

(21) Appl. No.: 16/603,490

(22) PCT Filed: Apr. 3, 2018

(86) PCT No.: PCT/JP2018/014290
§ 371 (c)(1),
(2) Date: Oct. 7, 2019

(87) PCT Pub. No.: WO2018/186406
PCT Pub. Date: Oct. 11, 2018

(65) Prior Publication Data
US 2020/0041287 A1   Feb. 6, 2020

(30) Foreign Application Priority Data

Apr. 7, 2017 (JP) .............................. JP2017-077170

(51) Int. Cl.
*G01C 21/34* (2006.01)
*B60W 30/06* (2006.01)
*G08G 1/16* (2006.01)

(52) U.S. Cl.
CPC ............ *G01C 21/34* (2013.01); *B60W 30/06* (2013.01); *G08G 1/168* (2013.01)

(58) Field of Classification Search
CPC ............ G08G 1/00; G08G 1/168; G08G 1/16; B60W 30/00; B60W 30/06;
(Continued)

(56) References Cited

U.S. PATENT DOCUMENTS

| 8,521,366 B2 * | 8/2013 | Schneider .......... B62D 15/0285 |
| | | 701/41 |
| 2012/0197492 A1 | 8/2012 | Schneider et al. |
| 2015/0100193 A1 | 4/2015 | Inagaki et al. |

FOREIGN PATENT DOCUMENTS

| JP | 2007-320433 A | 12/2007 |
| JP | 2010-208392 A | 9/2010 |

(Continued)

OTHER PUBLICATIONS

Extended European Search Report dated Dec. 7, 2020 for European Patent Application No. 18781334.0.

(Continued)

*Primary Examiner* — Anthony R Jimenez
(74) *Attorney, Agent, or Firm* — Volpe Koenig

(57) ABSTRACT

A parking assistance device that can, when assisting in angle parking, park a vehicle at a position intended by a driver and in a correct vehicle attitude. The parking assistance device includes a pull-out path computing unit that computes a pull-out path for pulling a vehicle out of a parking space based on parking space information and constraint conditions regarding vehicle behavior, a candidate connection position setting unit that sets a plurality of candidate connection positions the pull-out path, a reachable path computing unit that computes a reachable path that allows the vehicle to reach one of the plurality of candidate connection positions from the initial position, and a parking path setting unit that sets a parking path by connecting the pull-out path and the reachable path. The pull-out path computing unit computes the pull-out path based on the angle of inclination between the road orientation and the parking orientation.

5 Claims, 26 Drawing Sheets

(58) Field of Classification Search
CPC ......... B60W 2750/00; B60W 2520/00; B60W 2520/04; B60W 2520/06; B60W 2520/14; B60W 2520/16; B60W 2550/00; B60W 2550/10; B60W 2550/14; B60W 2550/143; B60W 2550/142; B60W 2550/146; B60W 2720/00; B60W 2720/24; B60W 30/10; B60W 30/12; B60W 30/143; B60W 30/18109; G01C 21/00; G01C 21/34; G01C 21/10; G01C 21/12; G01C 21/16; G01C 21/3407; G01C 21/3415; G01C 21/36; G01C 1/00; B62D 15/00; B62D 15/027; B62D 15/0285; B62D 15/021
USPC ........................................................ 701/23
See application file for complete search history.

(56) References Cited

FOREIGN PATENT DOCUMENTS

| | | | | |
|---|---|---|---|---|
| JP | 2013-500902 A | 1/2013 | | |
| JP | 2013-043511 A | 3/2013 | | |
| JP | 2014-141175 A | 8/2014 | | |
| JP | 2015-074253 A | 4/2015 | | |
| JP | 2015074253 A * | 4/2015 | ............ | B60W 30/06 |
| JP | 2016-016681 A | 2/2016 | | |
| JP | 2008-207732 A | 9/2018 | | |
| WO | 2013/072134 A1 | 5/2013 | | |
| WO | WO-2013072134 A1 * | 5/2013 | ......... | B62D 15/0285 |
| WO | 2018/003411 A1 | 1/2018 | | |

OTHER PUBLICATIONS

Japanese Office Action dated Dec. 22, 2020 for Japanese Patent Application No. 2017-077170.
Japanese Office Action dated Jun. 9, 2020 for the Japanese Patent Application No. 2017-077170.
International Search Report for PCT/JP2018/014290, dated May 22, 2018.
Chinese Office Action dated Feb. 16, 2022 for Chinese Patent Application No. 201880023760.0.

* cited by examiner

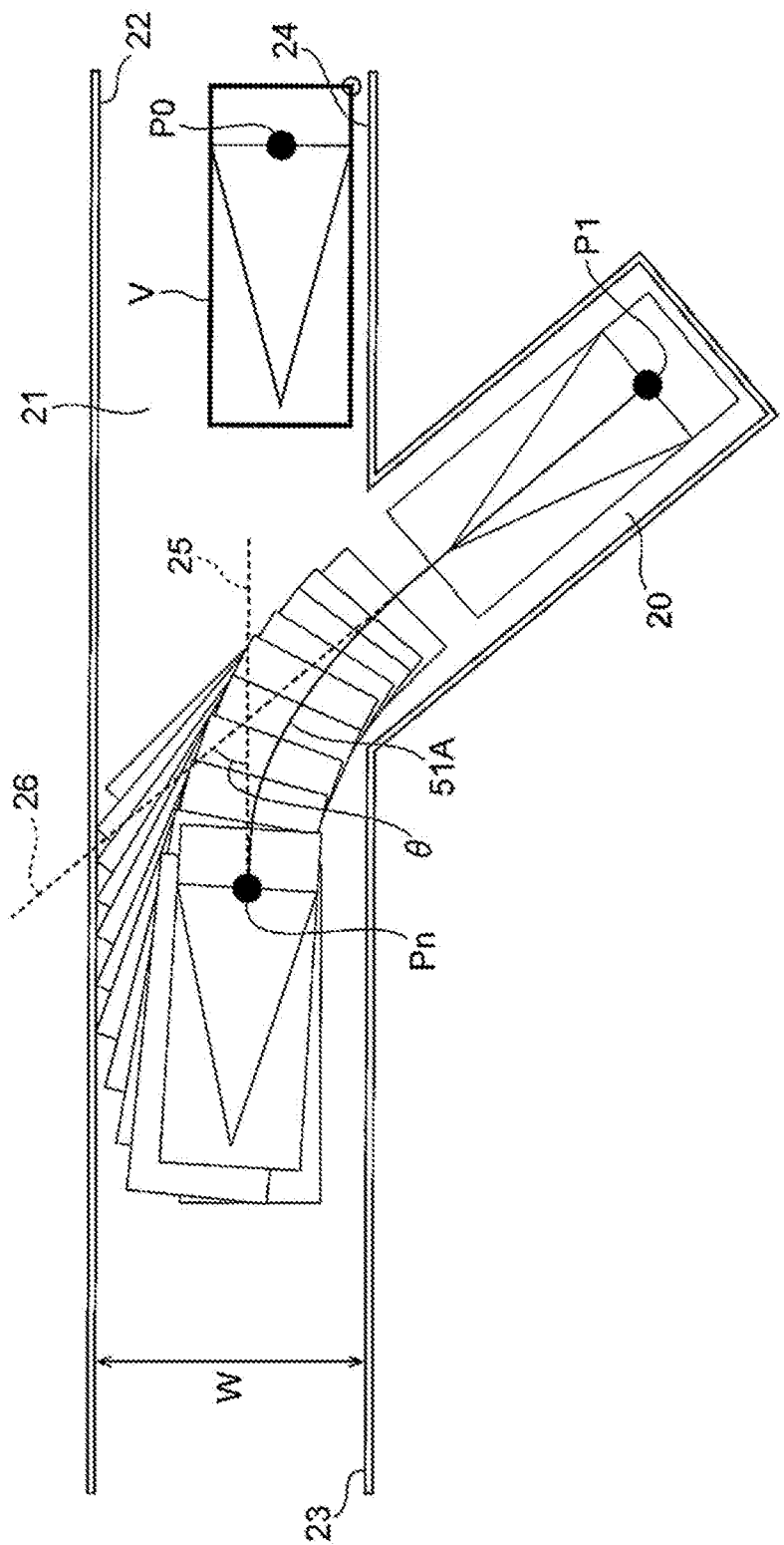

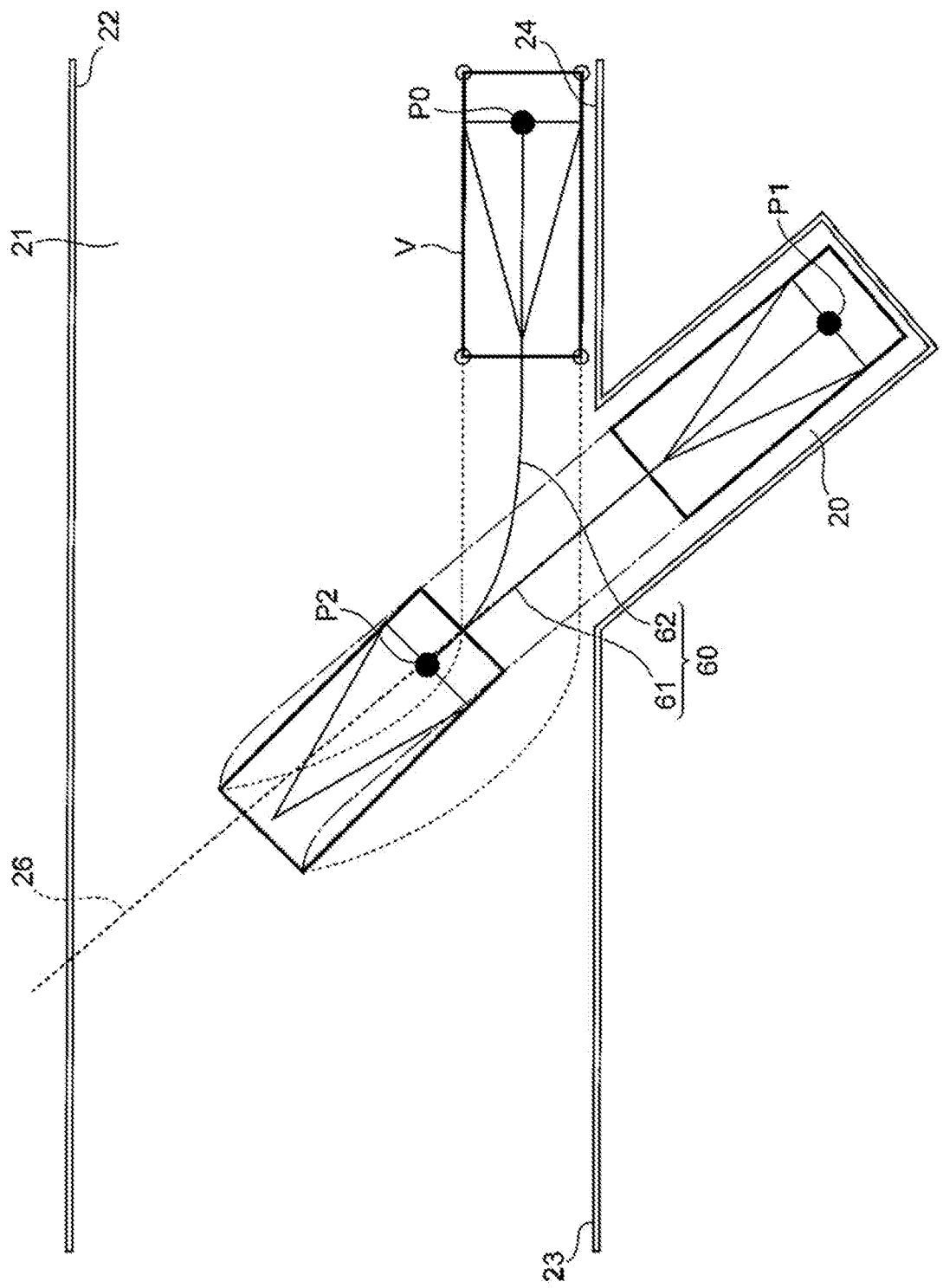

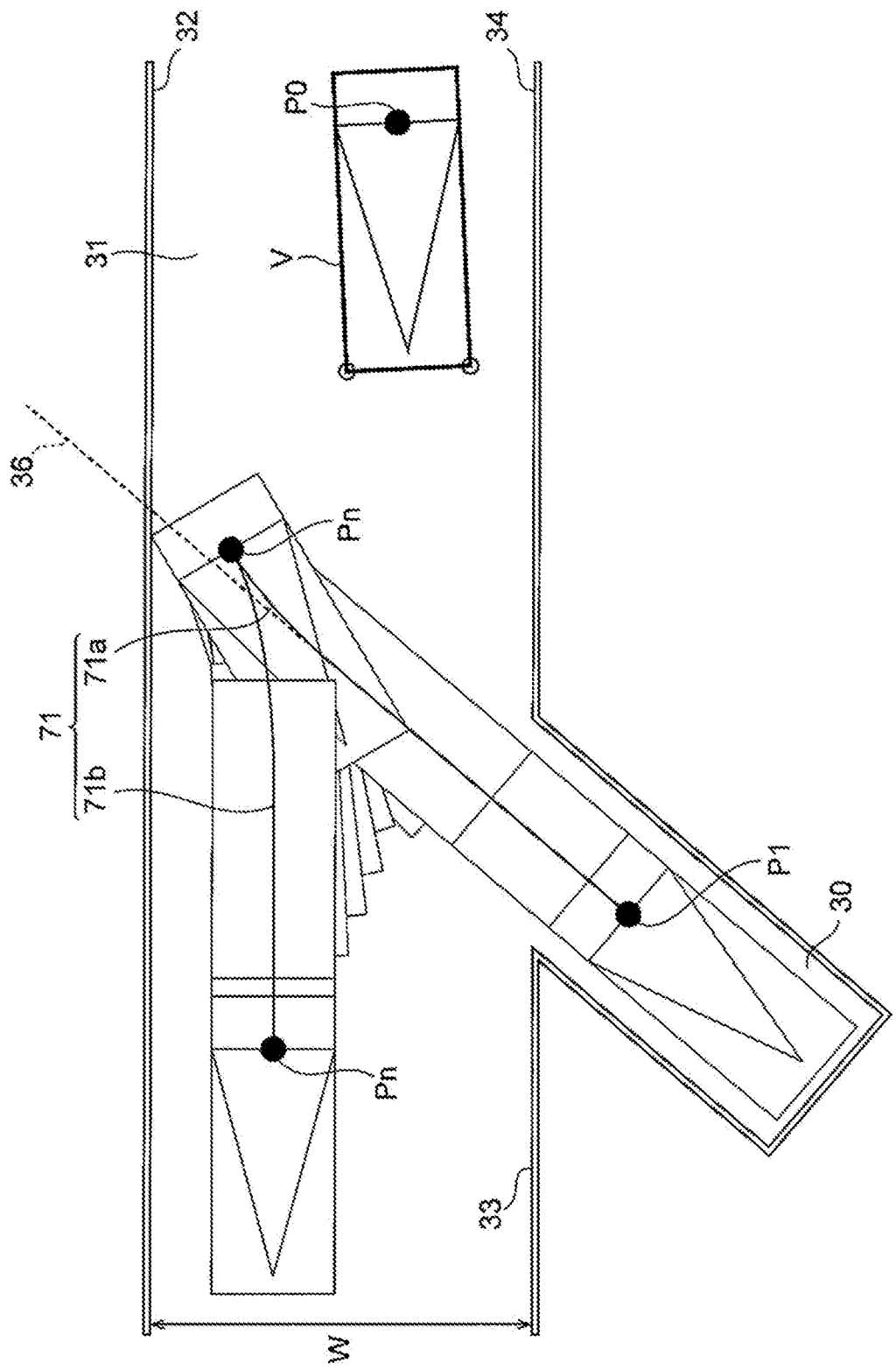

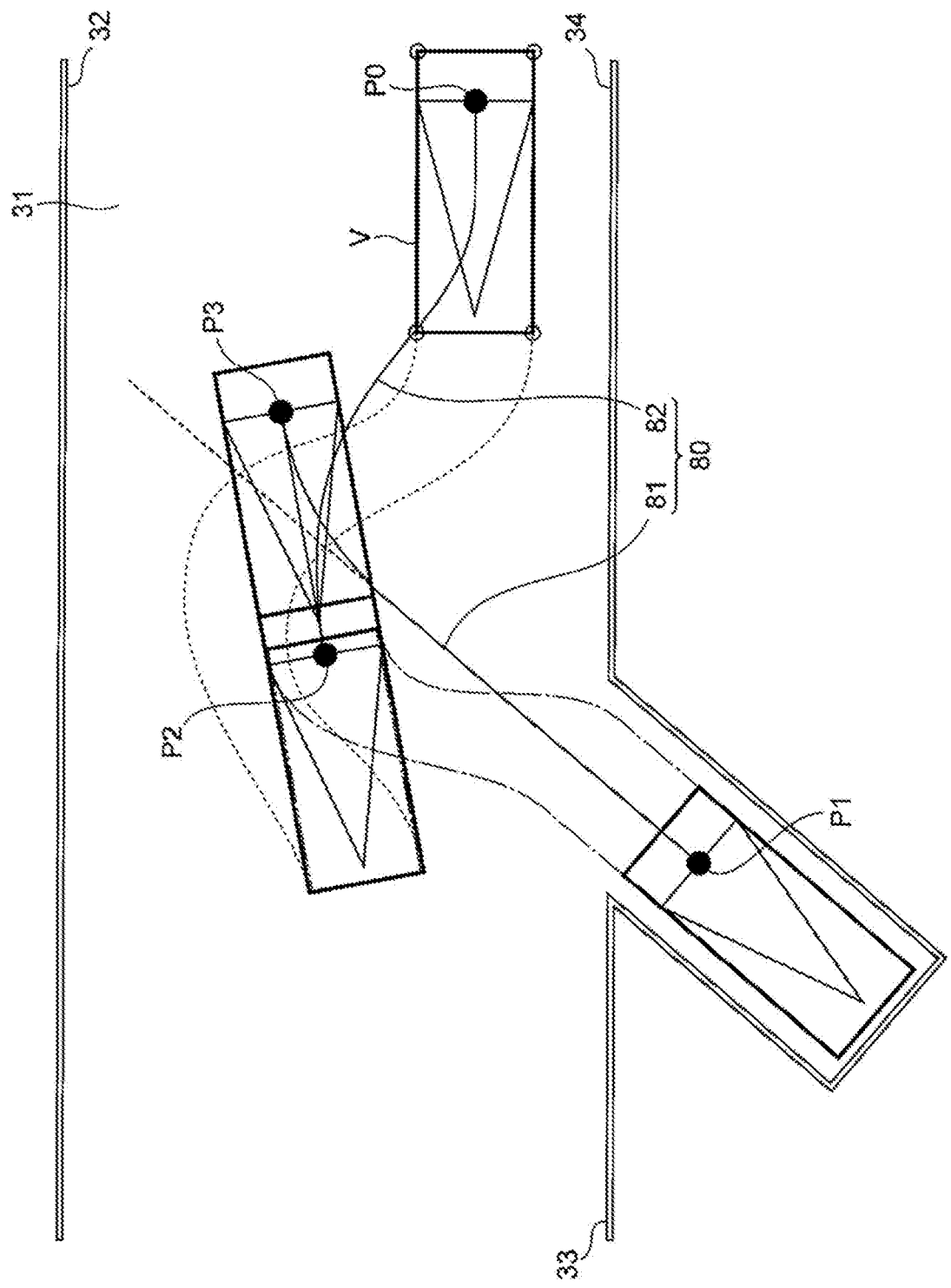

PARKING ASSISTANCE DEVICE

TECHNICAL FIELD

The present invention relates to a parking assistance device for a vehicle.

BACKGROUND ART

Patent Literature 1 discloses a technique of a parking assistance device that assists in parking a vehicle by computing a guidance path, which includes switching of the direction of vehicle travel for parking the vehicle, so that the vehicle can reach a target position along the guidance path.

CITATION LIST

Patent Literature

Patent Literature 1: JP 2010-208392 A

SUMMARY OF INVENTION

Technical Problem

According to the technique disclosed in Patent Literature 1, the guidance path is computed on the basis of the positional relationship and the vehicle attitude relationship between the initial position of the vehicle when parking assistance is started and the parking target position. Therefore, when the initial position of the vehicle is at a place from which the vehicle cannot be guided to the target parking position, for example, parking assistance cannot be performed.

In addition, when angle parking is performed in which the parking orientation of a parking space is diagonally inclined with respect to the road orientation of a road, a path space that is required for a parking path for the angle parking differs from that for perpendicular parking in which the parking orientation of a parking space is perpendicular to the road orientation of a road. Thus, the method used for perpendicular parking cannot be directly used for angle parking.

The present invention has been made in view of the foregoing. It is an object of the present invention to provide a parking assistance device that can assist in, when angle parking is performed, parking a vehicle at a position intended by a driver and in a correct vehicle attitude by computing a parking path for guiding the vehicle to a target parking position, independently of the initial position or vehicle attitude when parking assistance is started.

Solution to Problem

The parking assistance device of the present invention that solves the aforementioned problems is a parking assistance device for assisting in parking a vehicle in a parking space, comprising a pull-out path computing unit configured to compute a pull-out path for pulling the vehicle out of the parking space on the basis of information on the parking space and constraint conditions regarding vehicle behavior; a candidate connection position setting unit configured to set a plurality of candidate connection positions on the pull-out path computed by the pull-out path computing unit; a reachable path computing unit configured to compute a reachable path that allows the vehicle to reach one of the plurality of candidate connection positions from the current position of the vehicle; and a parking path setting unit configured to set a parking path by connecting the pull-out path and the reachable path, in which the pull-out path computing unit is configured to, when parking assisted is angle parking in which the vehicle is parked in the parking space that is arranged diagonally with respect to a road from the road, compute the pull-out path on the basis of the angle of inclination between the road orientation of the road and the parking orientation of the parking space.

Advantageous Effects of Invention

According to the present invention, it is possible to, when assisting in angle-parking, park a vehicle at a position intended by a driver and in a correct vehicle attitude by computing a parking path, which includes switching of the direction of vehicle drive for guiding the vehicle into a parking space, independently of the initial position or vehicle attitude when parking assistance is started. It should be noted that other problems, configurations, and advantageous effects will become apparent from the following description of embodiments.

Further features related to the present invention will become apparent from the description of the specification and the accompanying drawings. In addition, other problems, configurations, and advantageous effects will become apparent from the following description of embodiments.

BRIEF DESCRIPTION OF DRAWINGS

FIG. 5A is a schematic diagram illustrating a pull-out path for back-in angle parking and candidate connection positions thereon.

FIG. 6B is a schematic diagram illustrating a parking path obtained by connecting a pull-out path and a reachable path via a park-out position selected from among the candidate connection positions illustrated in FIG. 6A.

FIG. 7A is a schematic diagram illustrating a pull-out path for front-in angle parking and a plurality of candidate connection positions thereon.

FIG. 8B is a schematic diagram illustrating a parking path obtained by connecting a pull-out path and a reachable path via a park-out position from among the plurality of candidate connection positions illustrated in FIG. 8A.

DESCRIPTION OF EMBODIMENTS

Next, embodiments of the present invention will be described with reference to the drawings. Although the following description illustrates an example in which a parking space is provided to the left of a road, the present invention is similarly applicable to a case where a parking space is provided to the right of a road.

Figure 1:
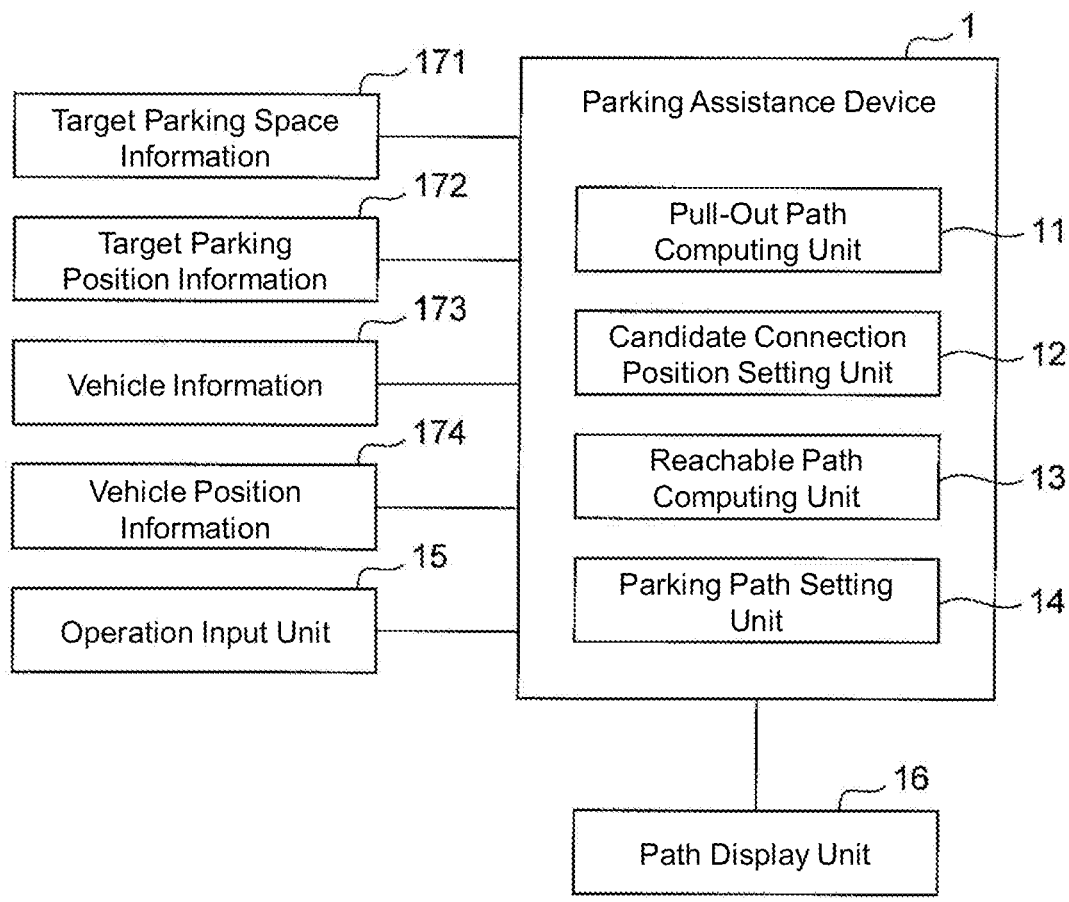
FIG. 1 is a functional block diagram of a parking assistance device according to an embodiment of the present invention.
Figure 2A:
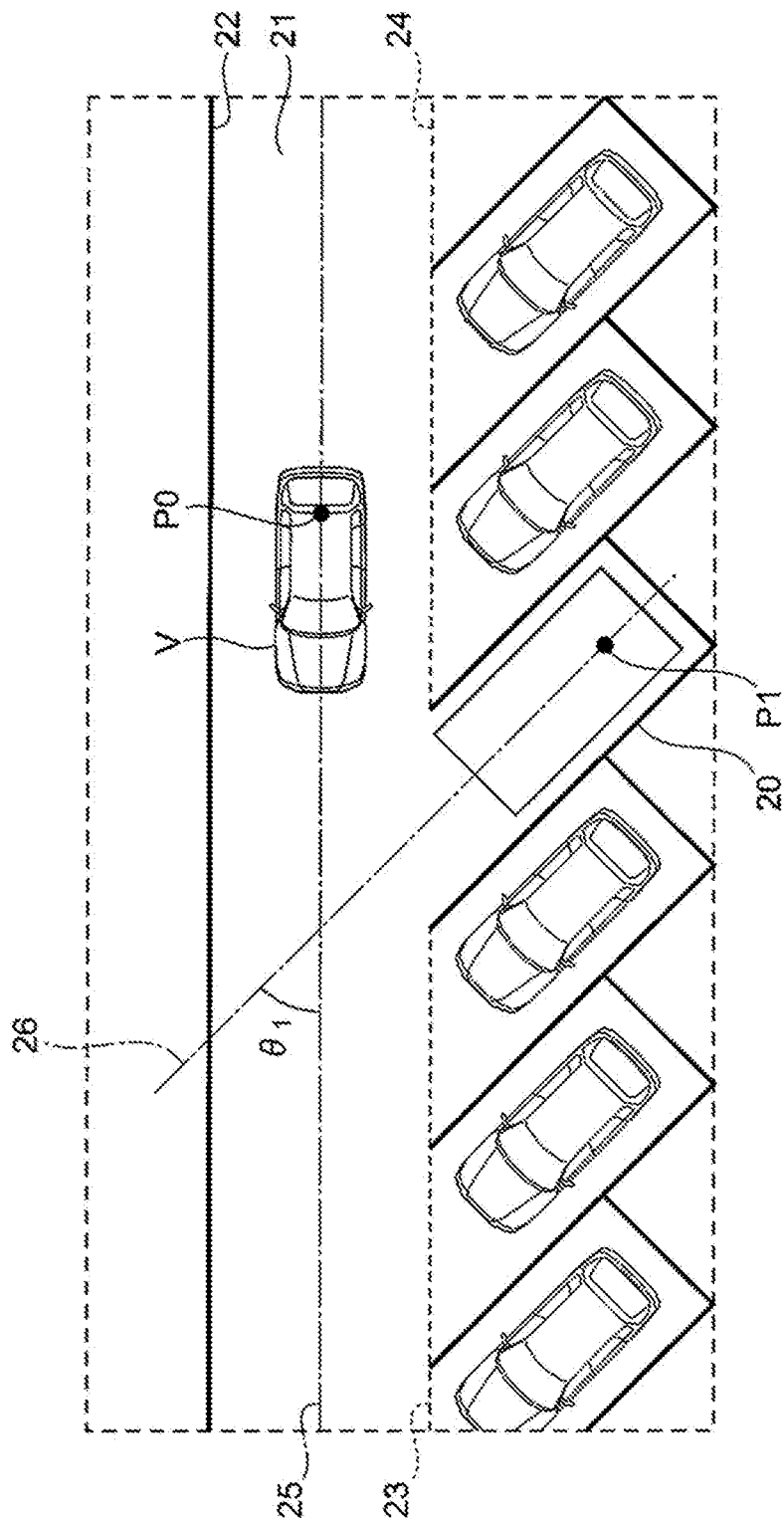
FIG. 2A illustrates an example of a parking space for back-in angle parking.
Figure 2B:
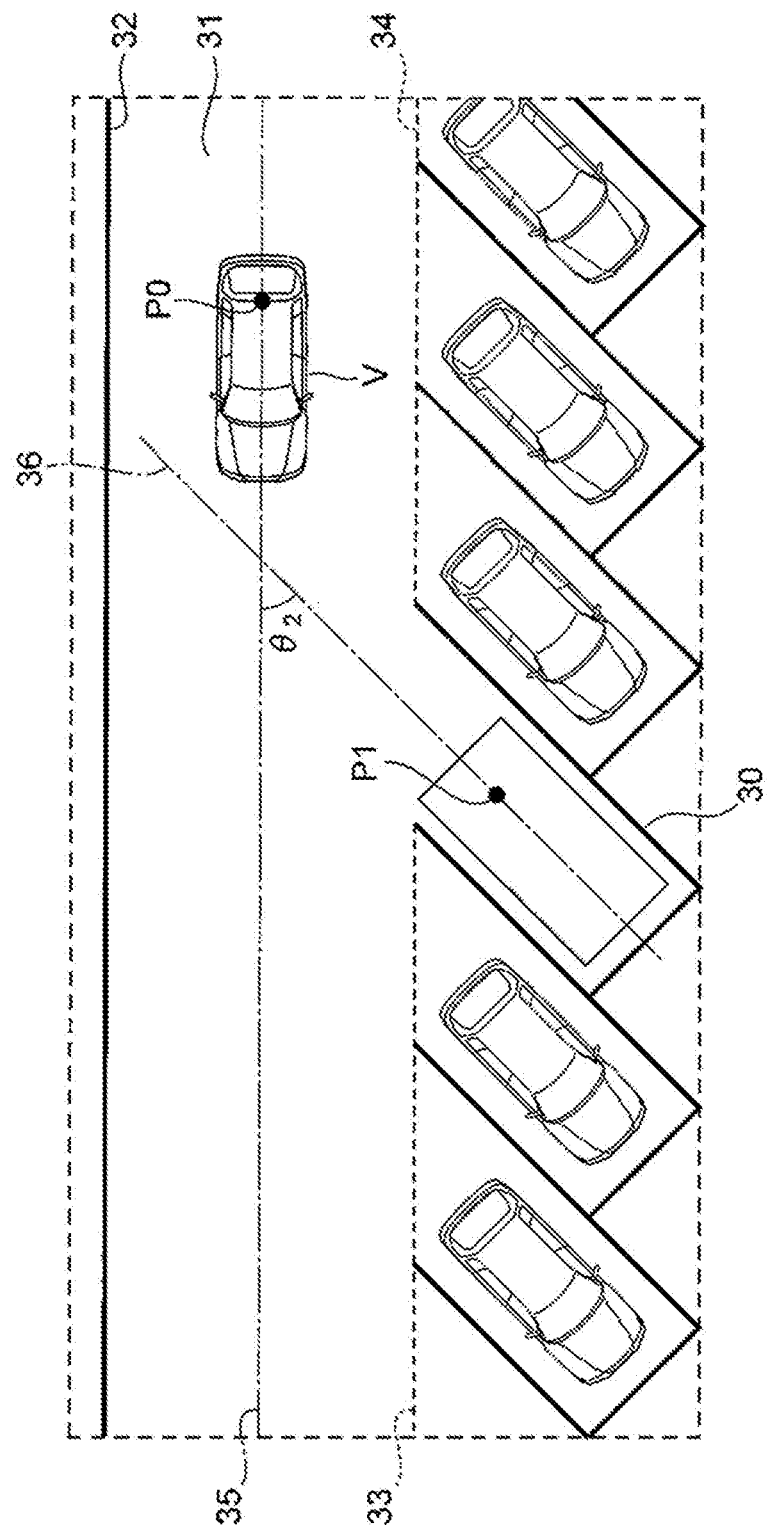
FIG. 2B illustrates an example of a parking space for front-in angle parking.

FIG. 1 is a functional block diagram of a parking assistance device according to an embodiment of the present invention. FIG. 2A illustrates an example of a parking space for back-in angle parking. FIG. 2B illustrates an example of a parking space for front-in angle parking.

"Angle parking" as referred to in the present embodiment means a process of parking a vehicle in a parking space, which is arranged diagonally with respect to a road, from the road. Examples of angle parking include back-in angle parking in which a vehicle is reverse parked in a parking space 20 as illustrated in FIG. 2A, and front-in angle parking in which a vehicle is front-in parked in a parking space 30 as illustrated in FIG. 2B.

Examples of a parking space for back-in angle parking include the one illustrated in FIG. 2A in which the parking space 20 is arranged diagonally on one side of a road 21 such that the road orientation 25 of the road 21 and the parking orientation 26 of the parking space 20 intersect on the road 21 at a position ahead of the parking space 20. The angle of inclination $\theta 1$ of the parking orientation 26 of the parking space 20 with respect to the road orientation 25 of the road 21 is greater than 0° and less than 90°. In addition, side obstacles 23 and 24, such as other vehicles or other parking spaces, are arranged ahead of or behind the parking space 20 along the road 21, and also, an obstacle 22, such as a wall or a curb extending along the road orientation 25 of the road 21 or another vehicle, is arranged across the road 21 opposite to the parking space 20.

Examples of a parking space for front-in angle parking include the one illustrated in FIG. 2B in which the parking space 30 is arranged diagonally on one side of a road 31 such that the road orientation 35 of the road 31 and the parking orientation 36 of the parking space 30 intersect on the road 31 at a position behind the parking space 30. The angle of inclination $\theta 2$ of the parking orientation 36 of the parking space 30 with respect to the road orientation 35 of the road 31 is greater than 0° and less than 90°. In addition, side obstacles 33 and 34, such as other vehicles or other parking spaces, are arranged ahead of or behind the parking space 30 along the road 31, and an obstacle 32, such as a wall extending along the road orientation 35 of the road 31, is arranged across the road 31 opposite to the parking space 30.

Figure 3A:
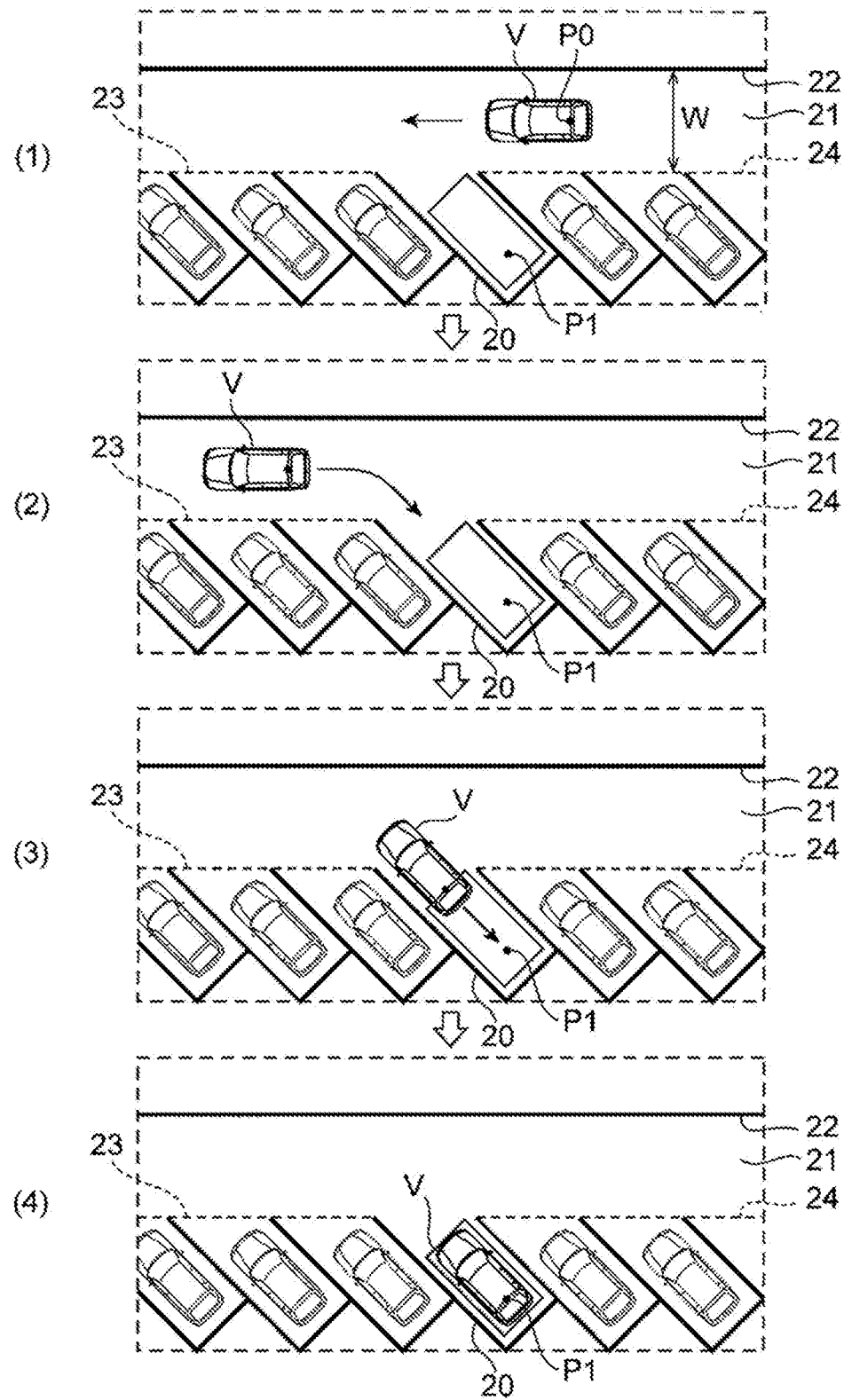
FIG. 3A illustrates an example of back-in angle parking.
Figure 3B:
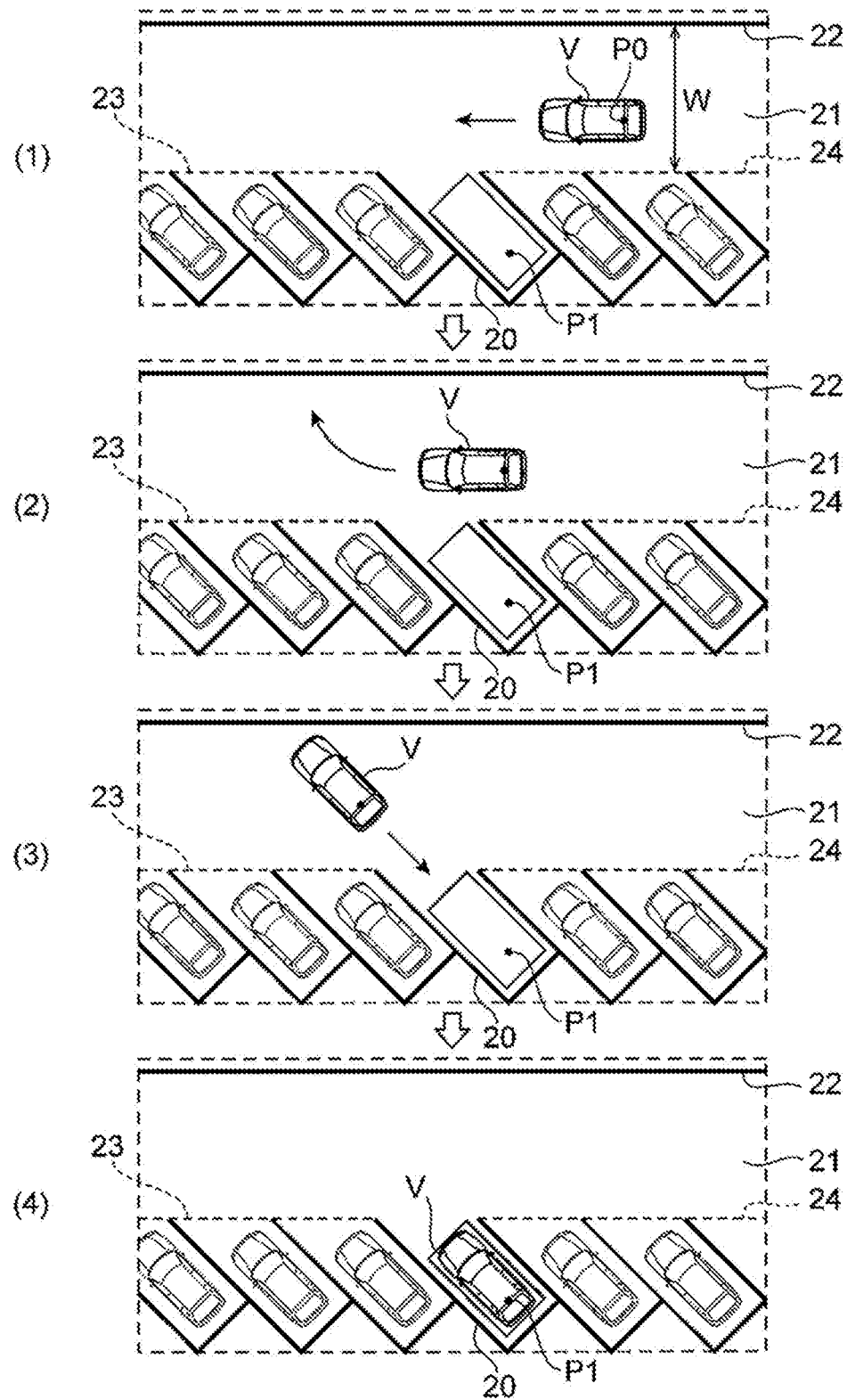
FIG. 3B illustrates an example of back-in angle parking.

FIGS. 3A and 3B each illustrate an example of back-in angle parking. For example, when a vehicle V is back-in angle parked into a parking space from a road with a narrow width W as illustrated in FIG. 3A, the vehicle V can take the following parking path. First, the vehicle V moves straight forward along the road orientation from the initial position P0 on the road (FIG. 3A(1)), and stops at a position past the parking space 20 (FIG. 3A(2)). Then, the vehicle V backs up while turning so that the rear of the vehicle V enters the parking space 20 (FIG. 3A(3)), and then, the vehicle V is arranged such that its orientation is aligned with the parking orientation at the target parking position P1 (FIG. 3A(4)). Meanwhile, when the vehicle V is back-in angle parked into a parking space from a road with a relatively wide width W as illustrated in FIG. 3B, the vehicle V can take the parking path illustrated in FIG. 3A, but can also take another parking path as follows. First, the vehicle V is moved forward from the initial position P0 on the road (FIG. 3B(1)), and is then turned in the direction away from the parking space 20 so that the rear of the vehicle V faces the parking space 20 (FIG. 3B(2)). Then, the vehicle V is backed up straight (FIG. 3B(3)) so as to enter the parking space 20 from its rear side, and then, the vehicle V is arranged such that its orientation is aligned with the parking orientation at the target parking position P1 (FIG. 3B(4)).

Figure 4A:
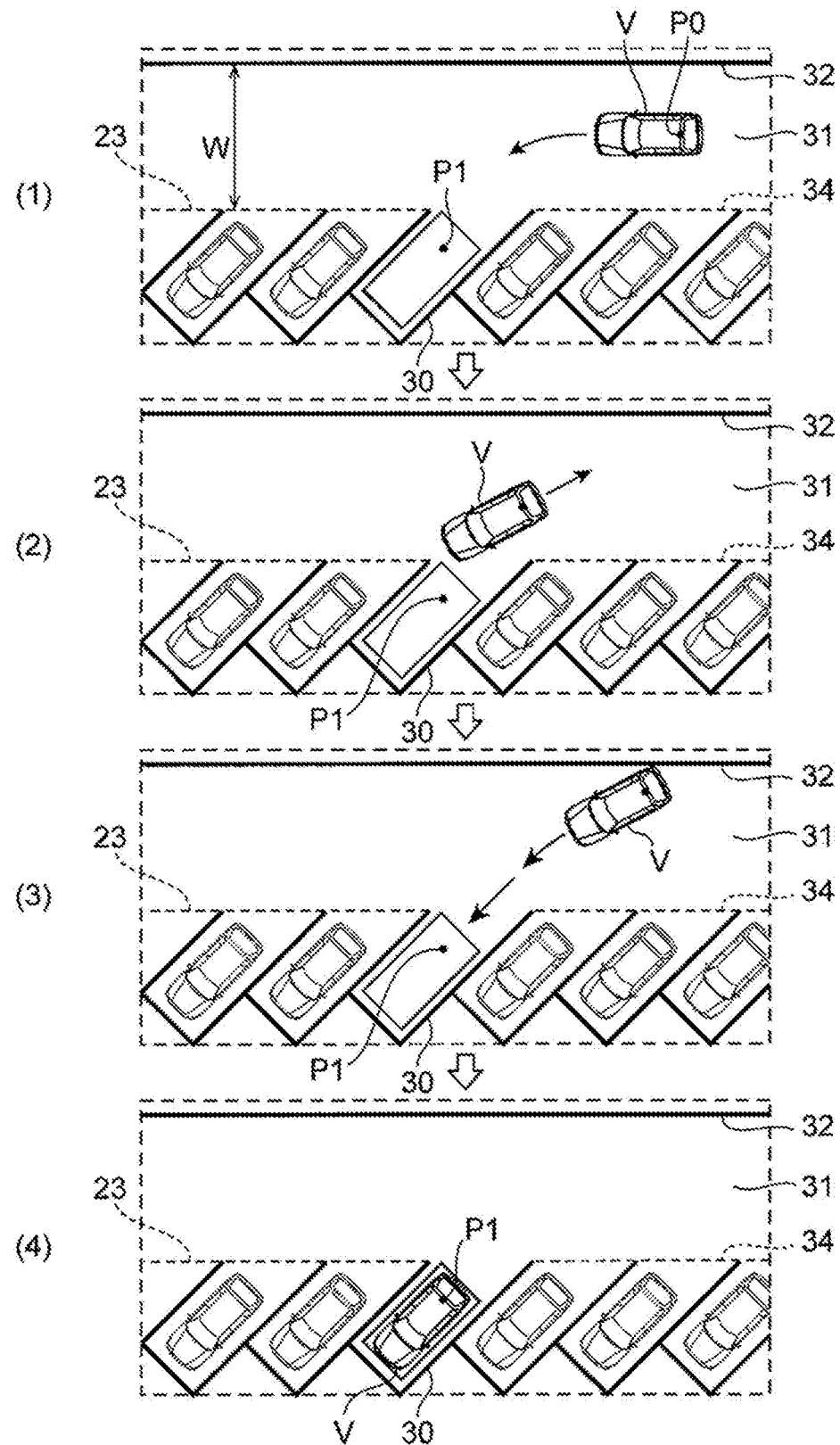
FIG. 4A illustrates an example of front-in angle parking.
Figure 4B:
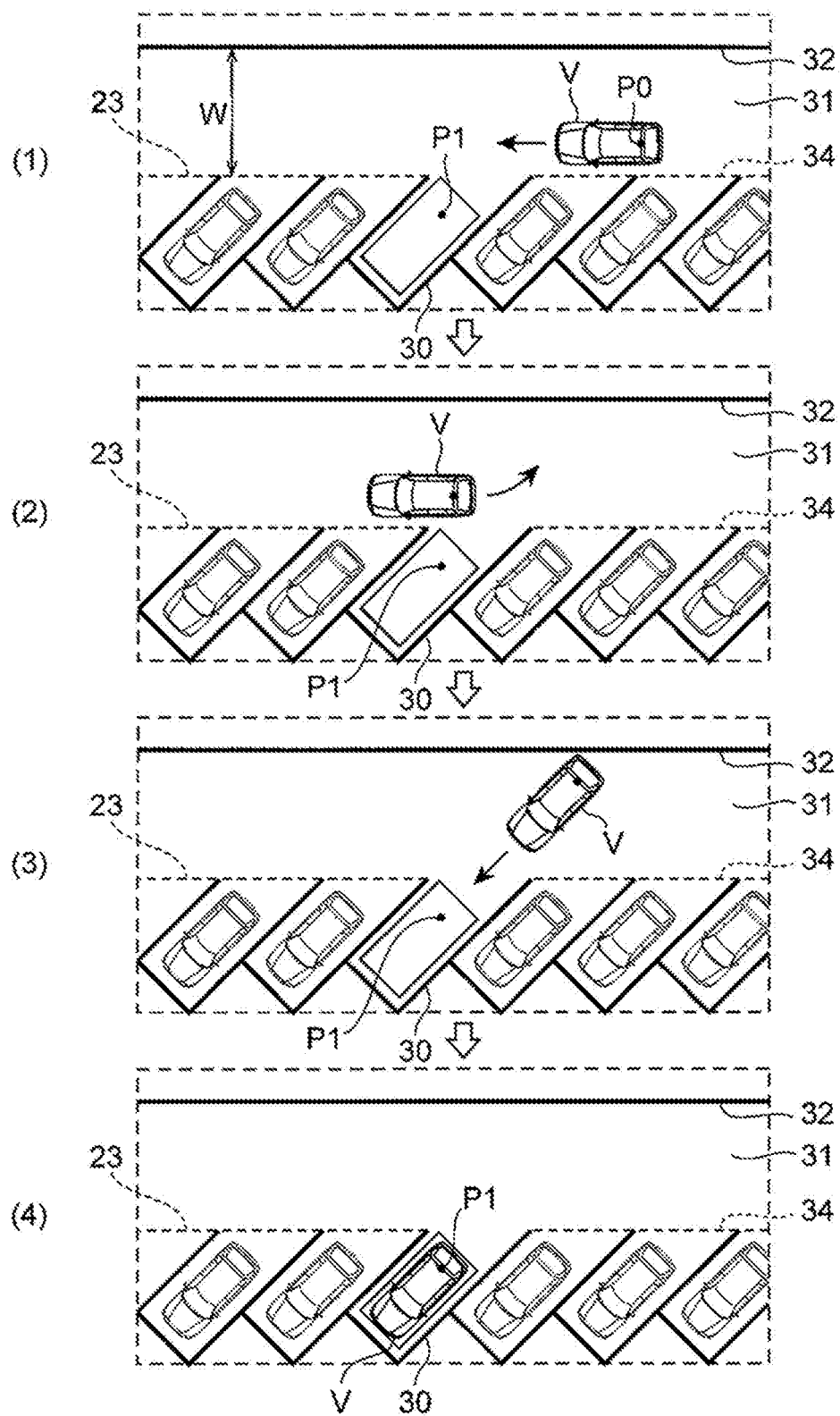
FIG. 4B illustrates an example of front-in angle parking.

FIGS. 4A and 4B each illustrate an example of front-in angle parking. For example, when a vehicle V is front-in angle parked as illustrated in FIG. 4A, the vehicle V can take the following parking path. First, the vehicle V moves forward while turning in the direction toward the parking space 30 from the initial position P0 on the road 21 (FIG. 4A(1)), and stops in front of the obstacle 33 (FIG. 3A(2)). Then, the vehicle V backs up straight and stops in front of the obstacle 32 so that the vehicle V moves forward again while turning in the direction toward the parking space 30 (FIG. 3A(3)). Then, the vehicle V is moved into the parking space 30 and is arranged such that its orientation is aligned with the parking orientation at the target parking position P1 (FIG. 3A(4)). Alternatively, as illustrated in FIG. 4B, the vehicle V is moved forward from the initial position P0 on the road 21 (FIG. 4B(1)) and is stopped in front of the parking space 30, and then, the vehicle V is backed up with its front wheels turned in the direction opposite to the parking space 30 (FIG. 4B(2)) so that the front of the vehicle V faces the parking space 30 (FIG. 4B(3)). Then, the vehicle V is moved straight forward so as to enter the parking space 30 from its front side so that the vehicle V can be arranged such that its orientation is aligned with the parking orientation at the target parking position P1 (FIG. 4B(4)).

In the present example, whether the vehicle V is at the initial position P0, the target parking position P1, a candidate connection position Pn described below, a park-out position P2 described below, or the like is determined with reference to a reference point Vo that is an intermediate position between the right and left rear wheels of the vehicle V. In addition, the vehicle is turned along a clothoid curve, for example.

The parking assistance device 1 of the present invention is adapted to assist in angle parking the vehicle V as described above, and is suited for assisting in an angle parking operation that requires switching of the direction of vehicle travel between forward drive and reverse drive at least once, for example. The parking assistance device 1 computes a parking path for guiding the vehicle V, and moves the vehicle V along the computed parking path so that the vehicle V can be parked in a parking space that is located diagonally on one side of a road. Alternatively, a system may be configured such that information on a parking path is output from the parking assistance device 1 and the vehicle V is parked at the target parking position P1 either automatically or semi-automatically. When the vehicle V is parked semi-automatically, steering wheel operations are controlled automatically, while accelerator and brake operations are conducted by the driver, for example.

The parking assistance device 1 is mounted on the vehicle V, and is implemented through cooperative operations of hardware, such as a microcomputer, and a software program. The parking assistance device 1 includes, as illustrated in FIG. 1, a pull-out path computing unit 11, a candidate connection position setting unit 12, a reachable path computing unit 13, and a parking path setting unit 14.

The pull-out path computing unit 11 computes at least one pull-out path for pulling the vehicle V out of a target parking space on the basis of information on the target parking space and constraint conditions regarding vehicle behavior. The candidate connection position setting unit 12 sets a plurality of candidate connection positions on the pull-out path. The reachable path computing unit 13 computes at least one reachable path that allows the vehicle V to reach each candidate connection position from the initial position P0 as the current position of the vehicle V. The parking path setting unit 14 sets a parking path for the vehicle V by connecting the pull-out path and the reachable path and, if there is a plurality of parking paths, selects an optimal parking path from among them on the basis of predetermined conditions.

The parking assistance device 1 receives, as illustrated in FIG. 1, target parking space information 171, target parking position information 172, vehicle information 173, and vehicle position information 174. The target parking space information 171 includes information on constraint conditions regarding a parking space, such as the positions of and distances to obstacles around the parking space, and the angle of inclination θ1 or θ2 between the road orientation of the road and the parking orientation of the parking space.

The target parking position information 172 includes information, such as the shape of the parking space and the relative position of the parking space with respect to the vehicle V. The vehicle information 173 includes information on constraint conditions regarding vehicle behavior, such as a turning radius of the vehicle. For the vehicle position information 174, dead reckoning positions computed with a vehicle model on the basis of the steering angle and speed of the vehicle as well as the number of revolutions of the wheels may be used, and also, positional information obtained with a sensor, such as a GPS, or vehicle position information obtained through road-vehicle communication or inter-vehicle communication may be used.

The operation input unit 15 inputs to the parking assistance device 1 information on a parking space selected by a user, for example. The path display unit 16 is an in-vehicle monitor that the driver can watch in the vehicle, and can display the positions for switching the direction of vehicle travel for a target parking path in a manner overlapped with a video from a camera. The path display unit 16 may display not only the positions for switching the direction of vehicle travel but also the entire parking path. Then, the driver is able to watch and check the positions for switching the direction of vehicle travel as well as a parking path displayed on the in-vehicle monitor. In addition, the path display unit 16 may display information to the effect that angle parking is being controlled either alone or in addition to displaying a parking path.

<Pull-out path computing unit>

The pull-out path computing unit 11 computes a pull-out path on the basis of the target parking space information 171, the target parking position information 172, and the vehicle information 173. The target parking space information 171 can be obtained from a detected signal of an ultrasonic sensor mounted on the vehicle V or an image from an in-vehicle camera, for example. In addition, infrastructure information output from a parking facility may be obtained. The pull-out path computing unit 11 determines whether the type of parking to be assisted is angle parking on the basis of the target parking space information 171, and if the type of parking to be assisted is determined to be angle parking, sets a path space in which a pull-out path is to be set, diagonally with respect to the road orientation.

The pull-out path is a virtual movement path obtained by estimating a path along which the vehicle V is pulled out of a parking space from the target parking position P1 therein. The pull-out path is computed totally independently of and without relevance to the initial position P0 of the vehicle V. The pull-out path computing unit 11 does not use the vehicle position information 174 when computing the pull-out path. More than one pull-out path may be computed, and at least one pull-out path is computed.

The pull-out path is computed on the basis of information on the target parking space and the constraint conditions regarding vehicle behavior. For example, when back-in angle parking is assisted, provided that the target parking position P1 is the origin, a path, which is based on the premise that the vehicle V will be pulled out of the parking space in the same direction as the orientation of the vehicle V at the initial position P0, is created, while when front-in angle parking is assisted, provided that the target parking position P1 is the origin, a path, which is based on the premise that the vehicle V will be pulled out of the parking space in the direction opposite to the orientation of the vehicle V at the initial position P0, is created.

For example, when back-in angle parking is assisted, a forward drive path is computed as the pull-out path for moving the vehicle V straight forward along the parking orientation from the target parking position P1 so that the reference point Vo of the vehicle V reaches a position outside of the parking space, and then moving the vehicle V forward from that position while turning the vehicle V in the same direction as the orientation of the vehicle V at the initial position P0. The forward drive path is computed until the vehicle V reaches a reachable limit position with respect to an obstacle ahead.

Then, when the vehicle V has reached the reachable limit position with respect to the obstacle ahead by moving forward, a reverse drive path for backing up the vehicle V straight is computed. The reverse drive path is computed until the vehicle V reaches a reachable limit position with respect to an obstacle behind. Then, when the vehicle V has reached the reachable limit position with respect to the obstacle behind by backing up, a forward drive path is computed again to move the vehicle V forward while turning the vehicle V in the direction to leave the parking space toward the same direction as the orientation of the vehicle V at the initial position P0. The forward drive path is computed until the vehicle V reaches the reachable limit position with respect to the obstacle ahead. The forward drive path and the reverse drive path are alternately computed until the vehicle V reaches a position that satisfies a predetermined termination condition. In the case of back-in angle parking, when the angle of orientation of the vehicle V with respect to the parking orientation 26 has become greater than or equal to the angle of inclination θ1, it is determined that the vehicle has reached the position that satisfies the predetermined termination condition, and thus, the computation of the pull-out path terminates.

Meanwhile, when front-in angle parking is assisted, a reverse drive path is computed to back up the vehicle V from the target parking position P1 so that the reference point Vo of the vehicle V reaches a position that is away from the parking space 30 by a predetermined distance, and then back up the vehicle V from that position while turning the vehicle V in the direction to leave the parking space toward a direction opposite to the orientation of the vehicle V at the initial position P0. The reverse drive path is computed until the vehicle V reaches a reachable limit position with respect to an obstacle behind.

Then, when the vehicle V has reached the reachable limit position with respect to the obstacle behind by backing up, a forward drive path is computed to drive the vehicle V forward with its front wheels turned in the direction to leave the parking space toward the same direction as the orientation of the vehicle V at the initial position P0. The forward drive path is computed until the vehicle V reaches a reachable limit position with respect to an obstacle ahead. Then, when the vehicle V has reached the reachable limit position with respect to the obstacle ahead by moving forward, a reverse drive path is computed again to back up the vehicle V while turning it in the direction to leave the parking space toward a direction opposite to the orientation of the vehicle V at the initial position P0. The reverse drive path is computed until the vehicle V reaches the reachable limit position with respect to the obstacle behind. The reverse drive path and the forward drive path are alternately computed to compute a pull-out path until a predetermined termination condition is satisfied. In the case of front-in angle parking, when the angle of orientation of the vehicle V with respect to the parking orientation 26 has become greater than or equal to the angle of inclination θ2, it is determined that the vehicle has reached a position that satisfies the predetermined termination condition, and thus, the computation of the pull-out path terminates.

The pull-out path computing unit 11 computes a pull-out path until at least one of the following conditions is satisfied as the predetermined termination condition: a first condition in which the angle between the parking orientation 26 of the parking space 20 and the orientation of the vehicle V becomes greater than or equal to the angle of inclination θ1 or θ2 between the road orientation 25 of the road 21 and the parking orientation of the parking space 20, a second condition in which the vehicle has reached a point, which is away from the target parking position P1 by a predetermined distance Hmax, along the road orientation, and a third condition in which the number of switching of the direction of vehicle travel along the pull-out path has reached a predetermined number.

The "reachable limit position" means a position at which the vehicle V is away from an obstacle with a predetermined gap therebetween. The predetermined gap includes an error taken into consideration as a margin so that the vehicle V will not contact the obstacle. The predetermined gap is preferably as small as possible, and is set to 1 to 50 cm, for example. In the present embodiment, a virtual frame with a predetermined gap is set in a region around the outer periphery of the vehicle V, and a position at which the virtual frame contacts the obstacle is determined as a reachable limit position.

The pull-out path computing unit 11 performs a process of, when back-in angle parking is assisted, increasing the number of pull-out paths in the width direction of a road as the width W of the road is wider. FIGS. 5A and 6A are schematic diagrams each illustrating a pull-out path for back-in angle parking and candidate connection positions thereon. For example, as illustrated in FIG. 5A, when the width W of the road 21 is less than a predetermined value, a pull-out path 51A that is right around a corner of the parking space 20 and thus is nearest to the parking space 20 is computed and set. Meanwhile, as illustrated in FIG. 6A, when the width W of the road 31 is greater than or equal to the predetermined value, the number of pull-out paths is increased in the width direction of the road 31.

The pull-out path computing unit 11 inserts, with reference to a pull-out path 61A at the nearest position, a straight line distance 63 extending along the parking orientation 26, into a portion on the pull-out path 61A to compute a pull-out path 61B at the farthest position from the parking space 20, and sets it.

Then, the pull-out path computing unit 11 computes a pull-out path 61C at an intermediate position between the nearest pull-out path 61A and the farthest pull-out path 61B and sets it. The intermediate pull-out path 61C is arranged at a position obtained by equally dividing the length between the nearest pull-out path 61A and the farthest pull-out path 61B by a preset number in accordance with the width W of the road 21. The dividing number herein is greater as the width W of the road 21 is wider. In the example illustrated in FIG. 6A, the intermediate pull-out path 61C is set at a position obtained by dividing the length between the nearest pull-out path 61A and the farthest pull-out path 61B in half. The intermediate pull-out path 61C is computed by inserting, with reference to the nearest pull-out path 61A, a straight line distance 64, which has been obtained by dividing the straight line distance 63 in half, into a portion on the pull-out path 61A.

It should be noted that the pull-out path computing unit 11 may not increase the number of pull-out paths with an increase in the width W of the road 21 but may perform a process of moving the position of the pull-out path 61A toward a side away from the parking space 20 along the parking orientation 26. For example, although the aforementioned process illustrates an example in which a total of three pull-out paths, including the nearest pull-out path 61A, the farthest pull-out path 61B, and the intermediate pull-out path 61C, are set, it is also possible to set only the farthest pull-out path 61B or only the intermediate pull-out path 61C by moving the nearest pull-out path 61A.

Figure 7B:
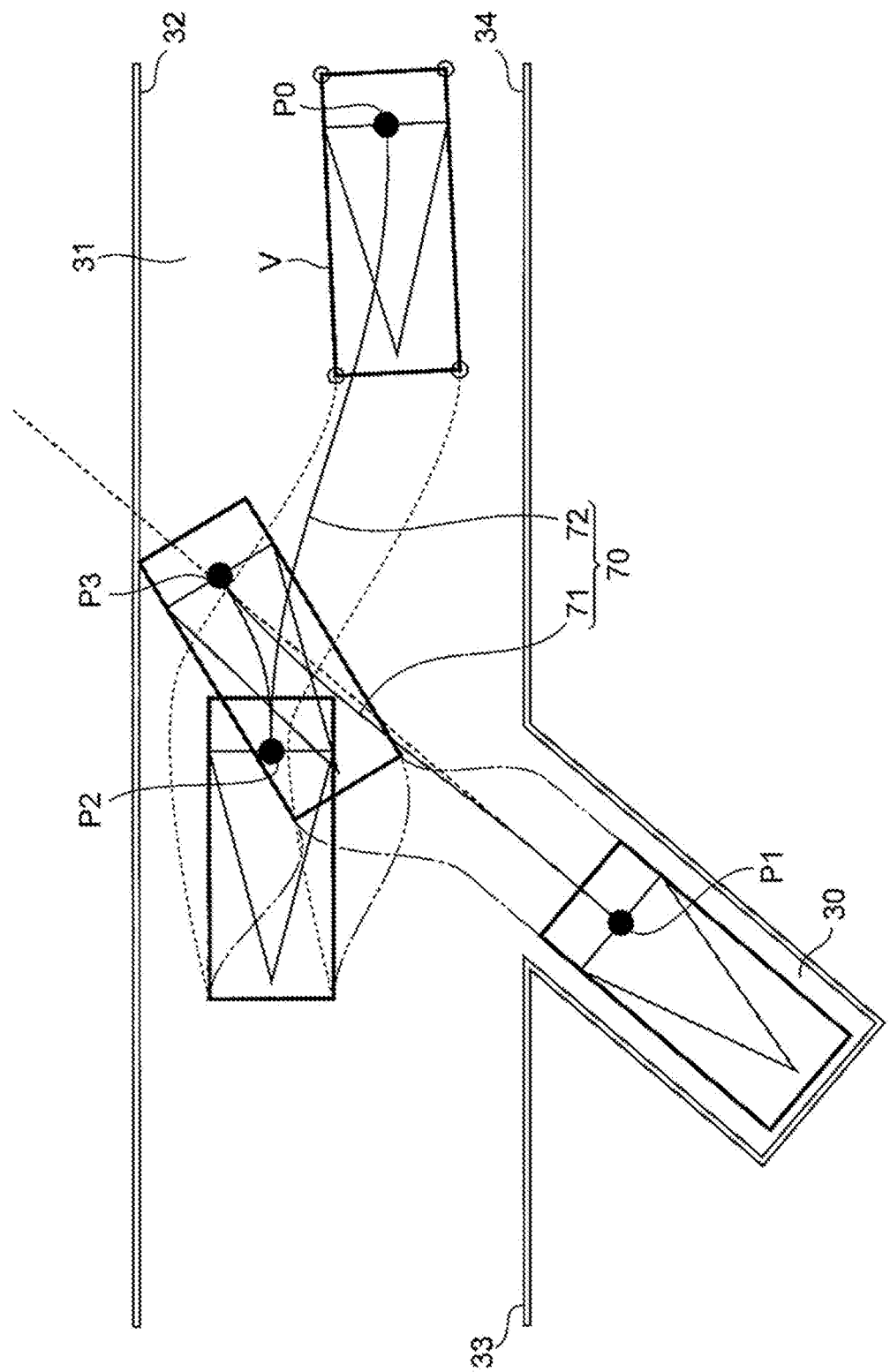
FIG. 7B is a schematic diagram illustrating a parking path obtained by connecting a pull-out path and a reachable path via a park-out position selected from among the plurality of candidate connection positions illustrated in FIG. 7A.
Figure 8A:
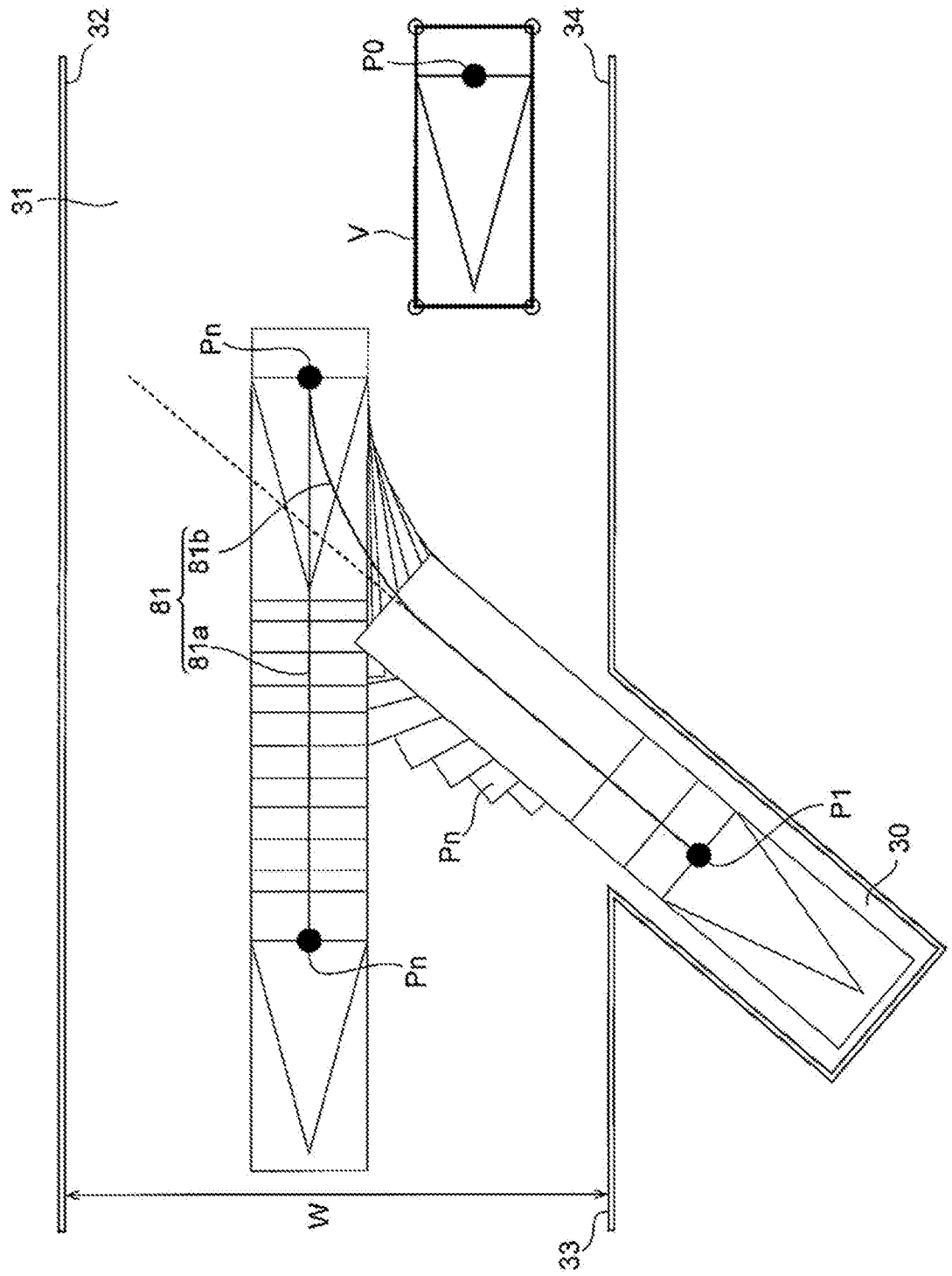
FIG. 8A is a schematic diagram illustrating a pull-out path for front-in angle parking and a plurality of candidate connection positions thereon.

The pull-out path computing unit 11 can compute, when front-in angle parking is assisted, both a pull-out path 71 including, as illustrated in FIG. 7A, a reverse drive path 71a for backing up the vehicle V from the parking space 20 and a forward drive path 71b for moving the vehicle V forward while greatly turning the vehicle V from a reachable limit position behind the vehicle, and a pull-out path 81 including, as illustrated in FIG. 8A, a reverse drive path 81*a* for backing up the vehicle V while greatly turning the vehicle V, and a forward drive path 81*b* for moving the vehicle V straight forward from a reachable limit position behind the vehicle V.

<Candidate Connection Position Setting Unit>

The candidate connection position setting unit 12 sets a plurality of candidate connection positions Pn on the pull-out path. A candidate connection position Pn is a candidate position for determining whether the initial position P0 can be connected to the pull-out path via a reachable path. The candidate connection position Pn is set each time the orientation of the vehicle V has changed by a predetermined relative angle (for example, every 5° (degrees)) when the vehicle V is moved in the direction to leave the parking space along the pull-out path. The candidate connection position setting unit 12 performs a process of setting the candidate connection positions Pn and storing them while linking them to information on the orientation of the vehicle V at those positions.

Figure 9:
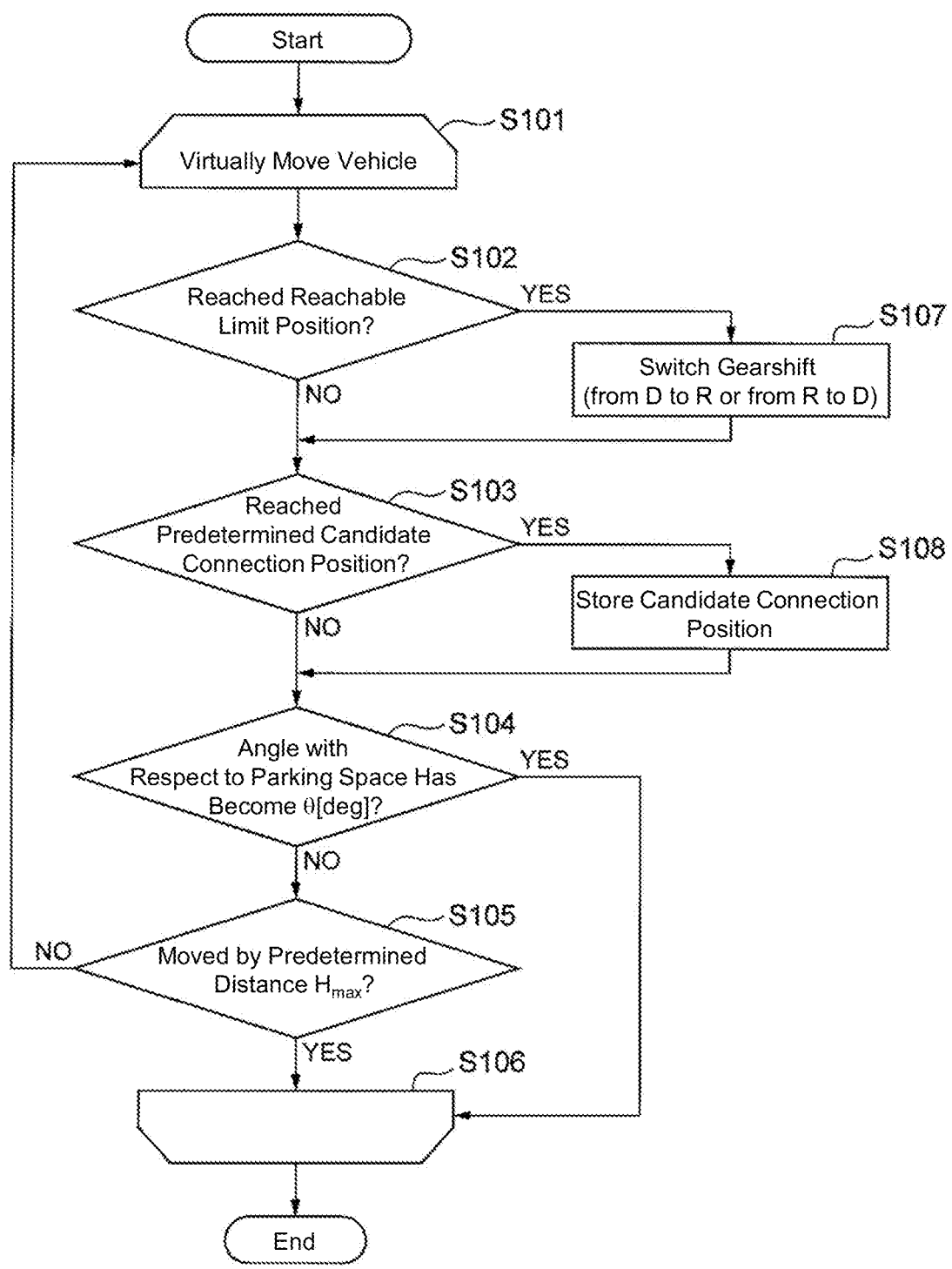
FIG. 9 is a flowchart illustrating a method of computing candidate connection positions on a pull-out path.

FIG. 9 is a flowchart illustrating a method of computing candidate connection positions on the pull-out path. First, the vehicle V is virtually moved along the pull-out path (S101), and whether the vehicle V has reached a reachable limit position is determined (S102). Whether the vehicle V has reached the reachable limit position is determined by checking whether the virtual frame of the vehicle V has collided with an obstacle. If the virtual frame of the vehicle V is determined to have collided with the obstacle, the vehicle V is determined to have reached a reachable limit position C. Then, if the vehicle V is determined to have reached the reachable limit position (YES in S102), the gearshift of the vehicle V is switched from the D (drive) range to the R (reverse) range or from the R range to the D range so that the direction of travel of the vehicle V is switched back from forward drive to reverse drive or from reverse drive to forward drive (S107).

Meanwhile, if the vehicle V is not determined to have reached the reachable limit position (NO in S102), whether the vehicle V has reached a predetermined candidate connection position is determined (S103). Herein, if the orientation of the vehicle V has changed by a predetermined relative angle, the vehicle V is determined to have reached a candidate connection position Pn (YES in S103), and information on the position and the orientation of the vehicle V is stored (S108). Then, whether the angle of orientation of the vehicle V with respect to the parking orientation 26 of the parking space 26 has become greater than or equal to the angle of inclination θ1 [deg] in the case of back-in angle parking or the angle of inclination θ2 [deg] in the case of front-in angle parking is determined (S104), and if the angle of orientation of the vehicle V is determined to have become greater than or equal to the angle of inclination θ1 [deg] or θ2 [deg], the first condition as the termination condition is determined to be satisfied, and thus, the present routine terminates (S106).

Meanwhile, if the angle of orientation of the vehicle V with respect to the parking orientation 26 of the parking space 20 is determined to be less than the angle of inclination θ1 or θ2 [deg] (NO in S104), whether the vehicle V has moved away from the parking space by a distance greater than or equal to a predetermined distance Hmax along the road orientation of the road is determined (S105). In the present embodiment, the predetermined distance Hmax is set to 7 meters. If the vehicle V is determined to have moved by a distance greater than or equal to the predetermined distance Hmax, the second condition is determined to be satisfied, and thus, the present routine terminates.

The candidate connection positions Pn are arranged along the pull-out path 51A in the example illustrated in FIG. 5A, and are arranged along the pull-out paths 61A, 61B, and 61C in the example illustrated in FIG. 6A. In addition, the candidate connection positions Pn are arranged along the pull-out path 71 in the example illustrated in FIG. 7A, and are arranged along the pull-out path 81 in the example illustrated in FIG. 8A.

<Reachable Path Computing Unit>

The reachable path computing unit 13 computes a reachable path that allows the vehicle V to reach at least one of the plurality of candidate connection positions Pn from the initial position P0 of the vehicle V. A "reachable path" is a path that allows the vehicle V to reach a candidate connection position Pn from the initial position P0 of the vehicle V through one of forward drive or reverse drive of the vehicle V, without switching between forward drive or reverse drive. Whether the vehicle V can reach the candidate connection position Pn is determined on the basis of the position and orientation of the vehicle V. If the position of the vehicle V coincides with the candidate connection position and the orientation of the vehicle V coincides with information on the orientation of the vehicle V that is stored in association with the candidate connection position, it is determined that the vehicle V can reach the candidate connection position Pn. Computation of the reachable path is performed on the basis of information on the vehicle position and specifications of the vehicle V. Reachable paths are sequentially computed from the side of a candidate connection position that involves a less number of switching of the direction of vehicle travel and is closer to the initial position P0 of the vehicle V.

If the vehicle V can be moved from the initial position P0 and arranged in a predetermined orientation at the candidate connection position Pn, then, the vehicle V can be moved to the target parking position P1 in the parking space 20 by inversely following the pull-out path. Thus, the reachable path computing unit 13 sets, among the plurality of candidate connection positions Pn on the pull-out path, a candidate connection position Pn at which the vehicle V can be arranged in a predetermined orientation from the initial position P0, as a park-out position P2, and computes a reachable path of from the initial position P0 to the park-out position P2.

Figure 10:
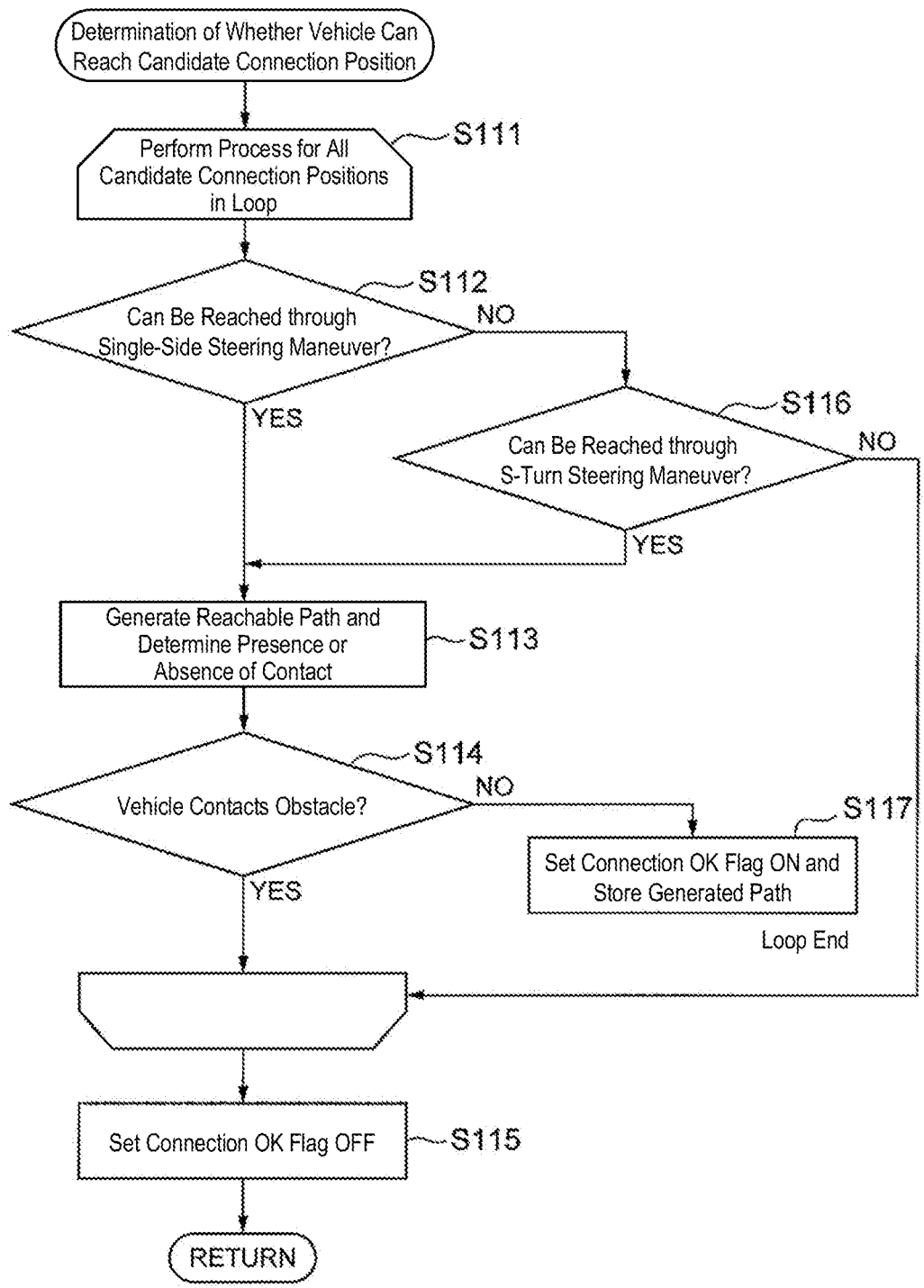
FIG. 10 is a process flow for determining whether a vehicle can reach a candidate connection position.

FIG. 10 is a process flow for determining whether the vehicle V can reach the candidate connection position Pn. This process flow is performed for all candidate connection positions in a loop (S111). First, whether the vehicle V can reach the candidate connection position Pn from the initial position P0 through a single-side steering maneuver is determined (S112). The "single-side steering maneuver" as referred to herein is an operation of turning the steering wheel of the vehicle V to only one of the right or left side of the vehicle V. If it is determined that the vehicle V cannot reach the candidate connection position Pn through a single-side steering maneuver, then, whether the vehicle V can reach the candidate connection position Pn through an S-turn steering maneuver is determined (S116). The "S-turn steering maneuver" as referred to herein is an operation of turning the steering wheel of the vehicle V to both the right and left sides of the vehicle V.

If it is determined that the vehicle V can reach the candidate connection position Pn through a single-side steering maneuver or an S-turn steering maneuver, such candidate connection position is selected as a park-out position P2, and a reachable path of from the initial position P0 of the vehicle V to the park-out position P2 is generated (S113).

Then, whether the vehicle V contacts an obstacle on the reachable path is determined (S114). If it is determined that the vehicle V does not contact the obstacle, the connection OK flag is set ON and the generated reachable path is stored in a storage, and thus, the loop terminates (S117). Meanwhile, if it is determined that the vehicle V cannot reach the candidate connection position Pn through a single-side steering maneuver or an S-turn steering maneuver (NO in S112 and S116), or if it is determined that the vehicle V contacts the obstacle (YES in S114), the determination for the relevant candidate connection position Pn terminates, and determination for the other remaining candidate connection positions Pn is performed. Then, if it is determined that the vehicle V cannot reach any of the candidate connection positions Pn, the connection OK flag is set OFF (S115), and the process flow terminates.

Figure 11A:
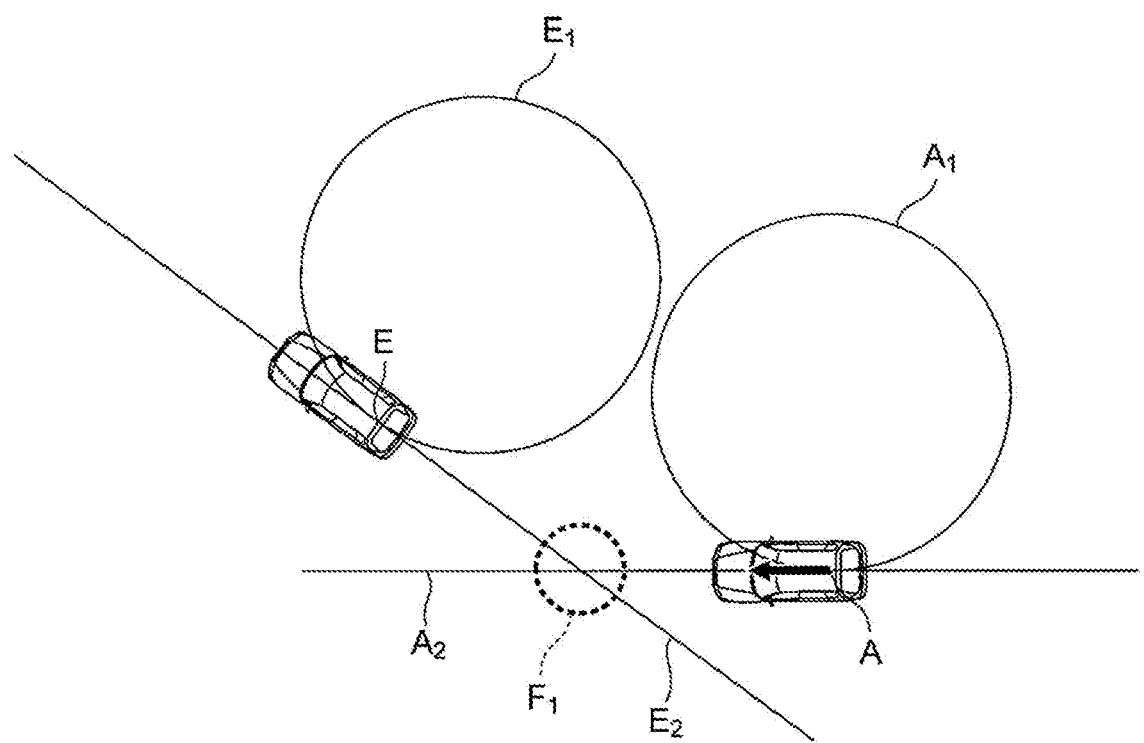
FIG. 11A illustrates an example of determination of whether the vehicle can reach the candidate connection position through a single-side steering maneuver.
Figure 11B:
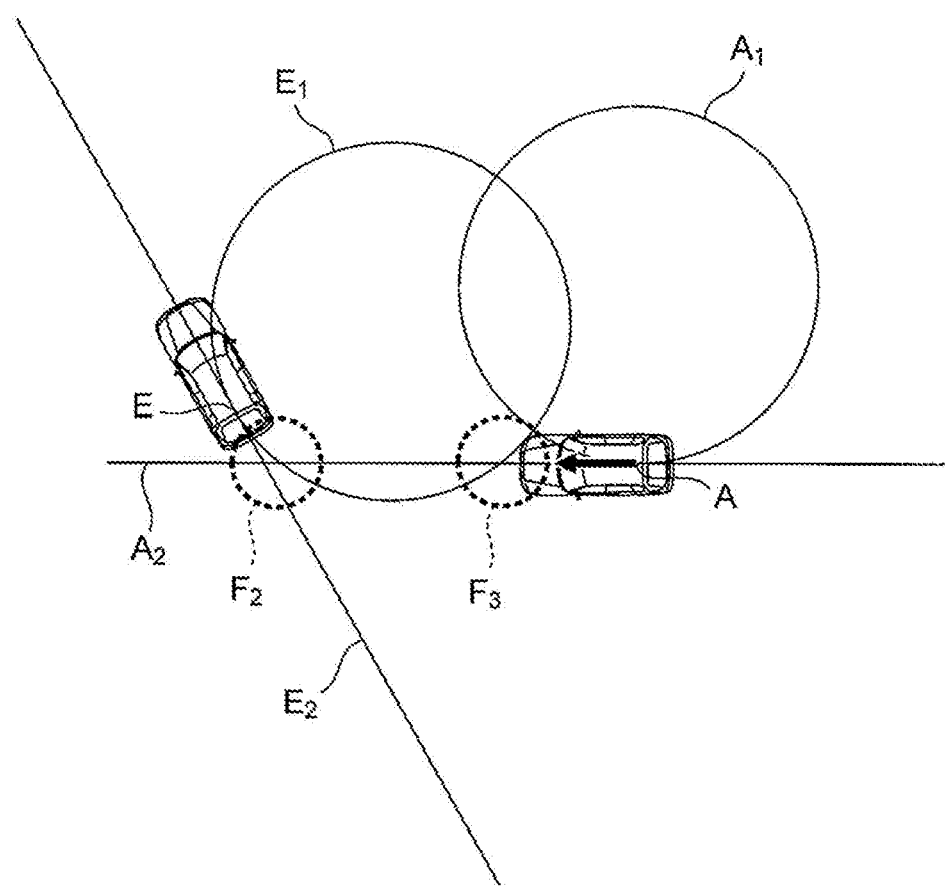
FIG. 11B illustrates an example of determination of whether the vehicle can reach the candidate connection position through a single-side steering maneuver.
Figure 11C:
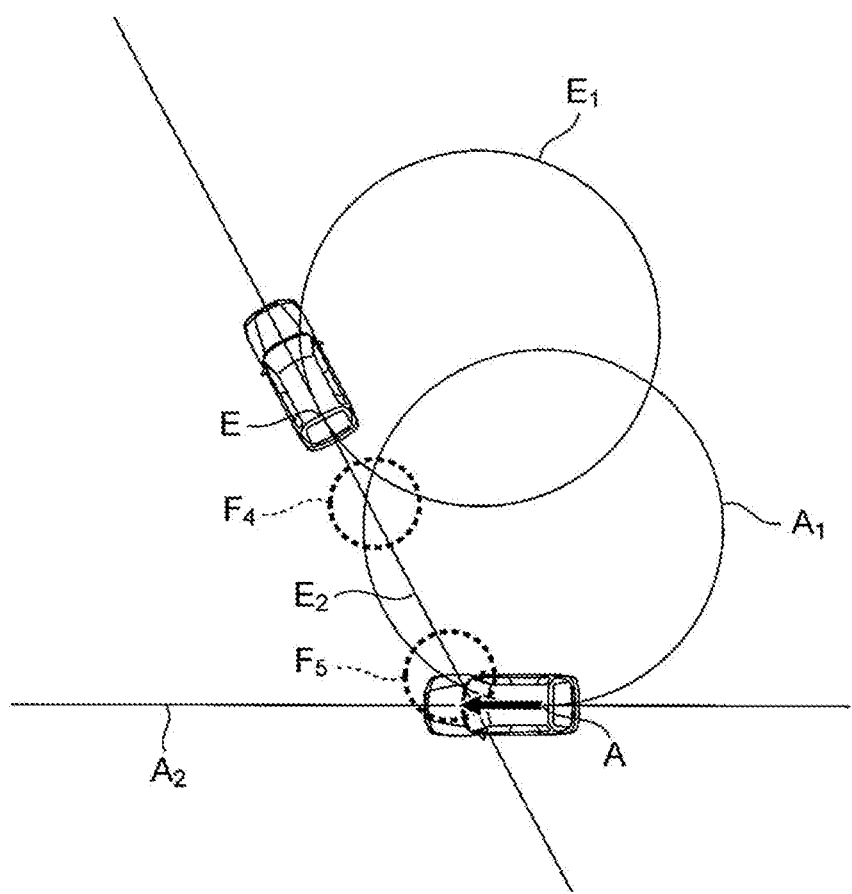
FIG. 11C illustrates an example of determination of whether the vehicle can reach the candidate connection position through a single-side steering maneuver.
Figure 11D:
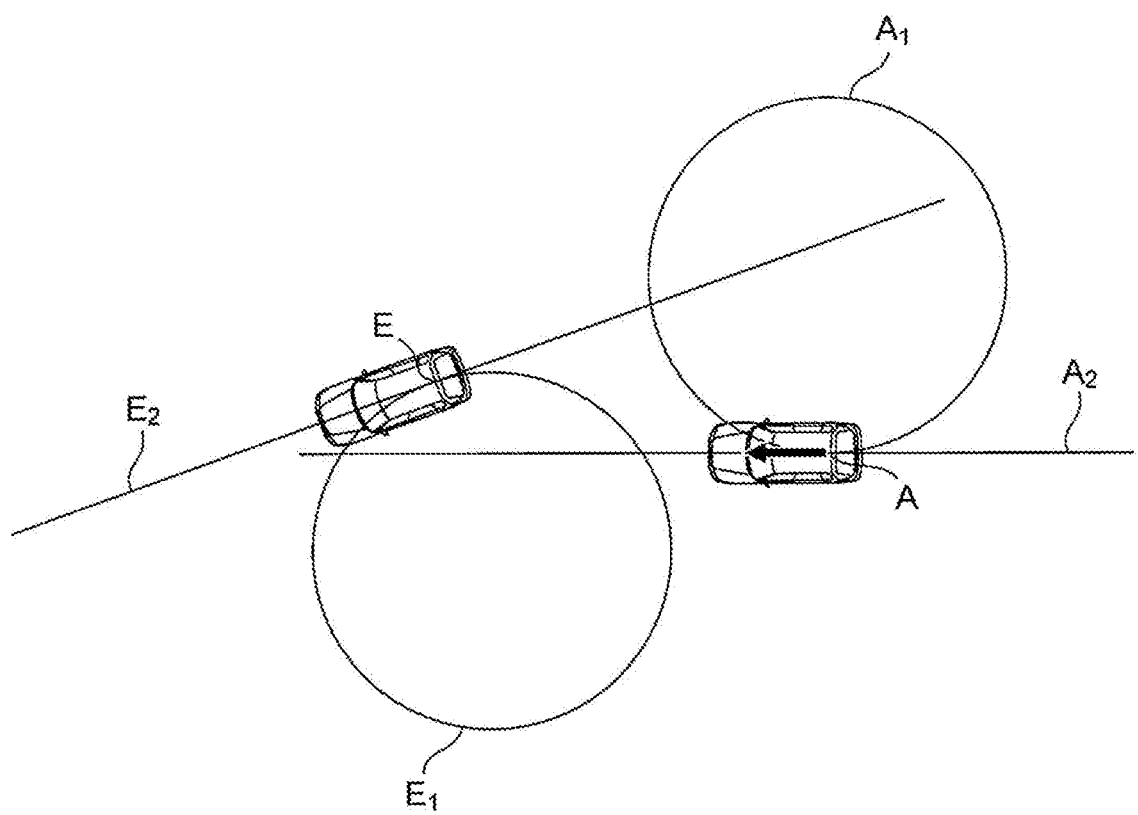
FIG. 11D illustrates an example of determination of whether the vehicle can reach the candidate connection position through an S-turn steering maneuver.
Figure 11E:
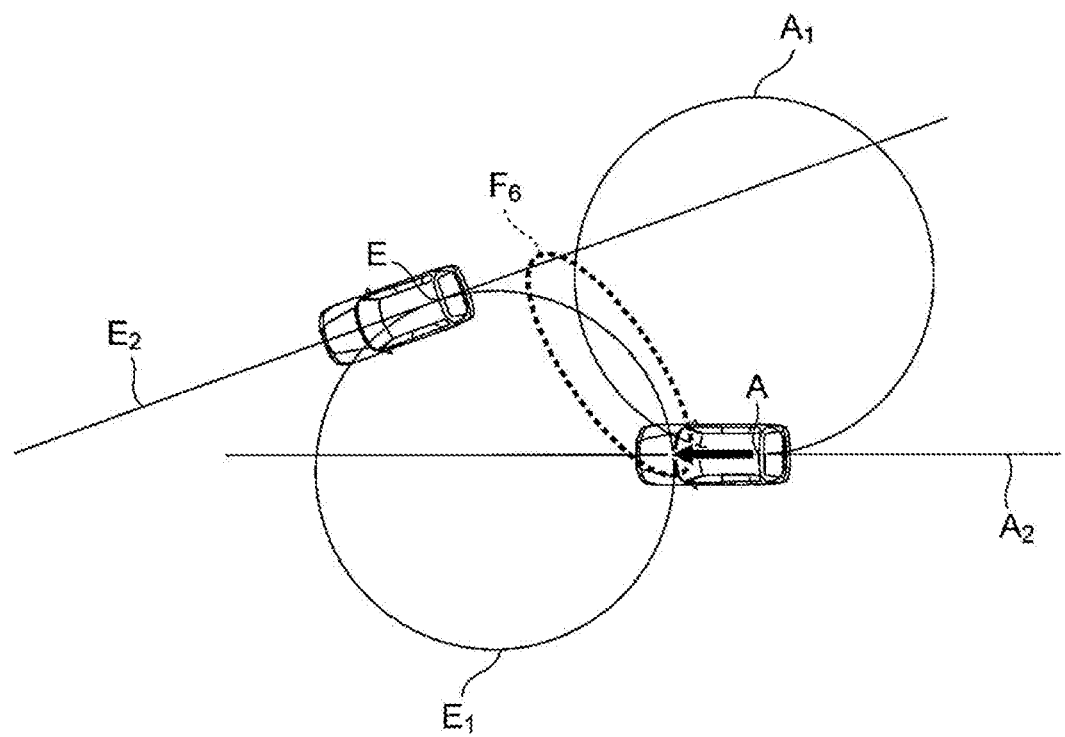
FIG. 11E illustrates an example of determination of whether the vehicle can reach the candidate connection position through an S-turn steering maneuver.

FIGS. 11A to 11C each illustrate an example of determination of whether the vehicle V can reach a candidate connection position through a single-side steering maneuver. FIGS. 11D and 11E each illustrate an example of determination of whether the vehicle V can reach a candidate connection position through an S-turn steering maneuver.

In the determination of whether the vehicle V can reach a candidate connection position through a single-side steering maneuver in S112, it is determined that the vehicle V can reach the candidate connection position if all of the following conditions (a1) to (a3) are satisfied (i.e., restrictions regarding the angular difference and positions are also imposed).

(a1) An axis A2 of the vehicle V at the current position A (i.e., initial position P0) intersects an axis E2 of the vehicle V at a candidate connection position E.

(a2) A turning circle A1 at the current position A does not intersect the axis E2 at the candidate connection position E.

(a3) A turning circle E1 at the candidate connection position E does not intersect the axis A2 at the current position A.

It should be noted that a "turning circle" herein means an arc on the turning side with the clothoid curve taken into consideration (i.e., minimum turning trajectory).

In the example illustrated in FIG. 11A, the aforementioned condition (a1) is satisfied since the axes A2 and E2 intersect at a position of intersection F1. Therefore, it is determined that the vehicle V can reach the candidate connection position through a single-side steering maneuver. Meanwhile, in FIG. 11B, the aforementioned condition (a3) is not satisfied since the turning circle E1 intersects the axis A2. In addition, in the example illustrated in FIG. 11C, the aforementioned condition (a2) is not satisfied since the turning circle A1 intersects the axis E2. Therefore, in the example illustrated in FIGS. 11B and 11C, it is determined that the vehicle V cannot reach the candidate connection position through a single-side steering maneuver, and the process proceeds to determination of whether an S-turn steering maneuver is available.

In the determination of whether the vehicle V can reach the candidate connection position through an S-turn steering maneuver in S116, it is determined that the vehicle V can reach the candidate connection position if the following condition (a4) is satisfied (i.e., restrictions regarding the angular difference and positions are also imposed).

(a4) The turning circle A1 at the current position A and the turning circle E1 at the candidate connection position E do not intersect.

In the example illustrated in FIG. 11D, the aforementioned condition (a4) is satisfied since the turning circle A1 and the turning circle E1 do not intersect. Therefore, it is determined that the vehicle V can reach the candidate connection position through an S-turn steering maneuver. Meanwhile, in the example illustrated in FIG. 11E, the aforementioned condition (a4) is not satisfied since the turning circle A1 and the turning circle E1 intersect. Therefore, it is determined that the vehicle V cannot reach the candidate connection position through an S-turn steering maneuver.

Figure 12:
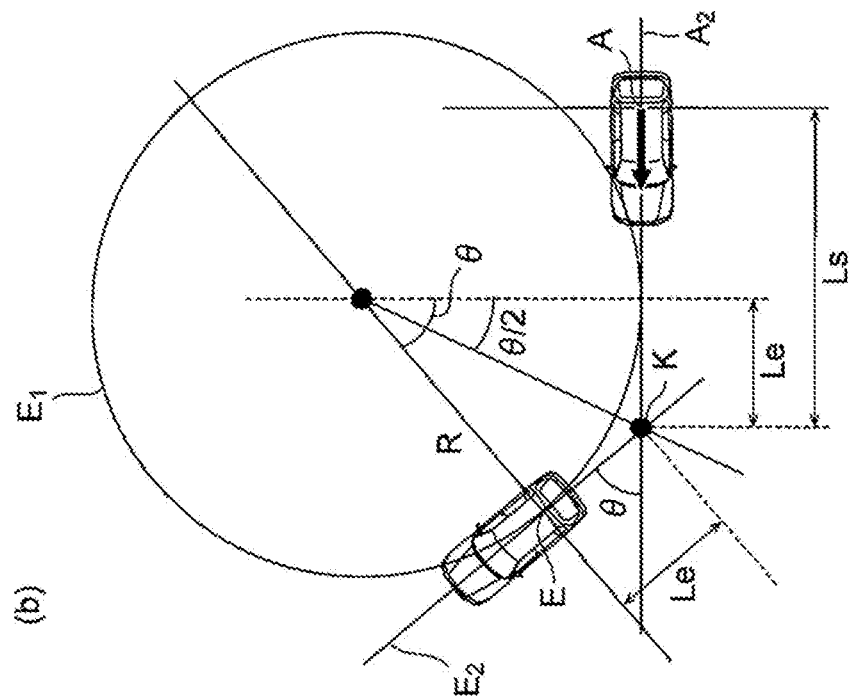
FIG. 12 illustrate a method of generating a reachable path that requires only a single-side steering maneuver.
Figure 12:
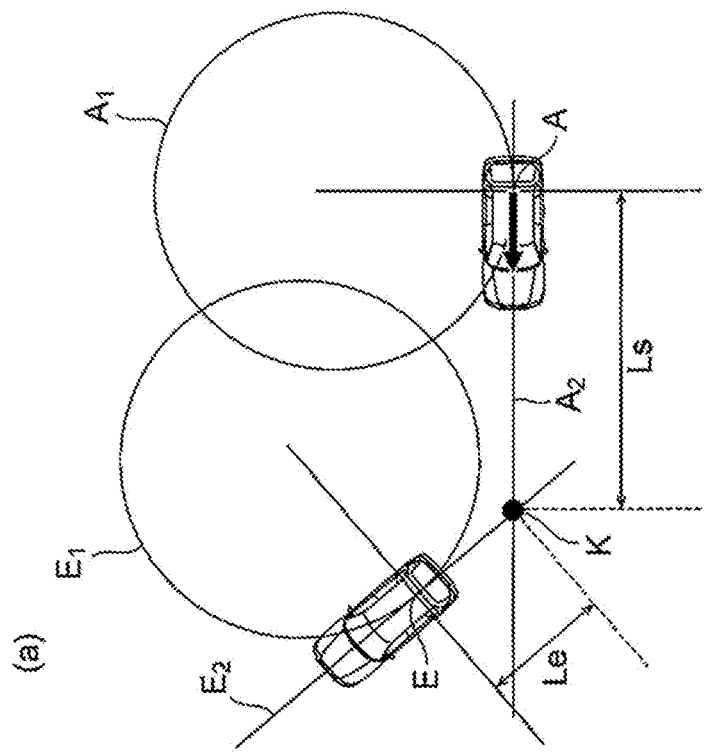

FIG. 12 illustrate a method of generating a reachable path that requires only a single-side steering maneuver. To generate a reachable path of from the current position A to the candidate connection position E that requires only a single-side steering maneuver, first, as illustrated in FIG. 12(a), the distance Ls between the intersection K between the axis A2 and the axis E2 and the current position A, and the distance Le between the intersection K and the candidate connection position E are computed, and the shorter distance is selected (i.e., the distance Le is selected in the example illustrated in the drawing). Then, as illustrated in FIG. 12(b), a circle having both the two axes A2 and E2 as tangents and passing through a point that is away from the intersection K by the shorter distance is depicted, and the radius R of the circle is computed through geometric computation using Formula (1) below.

[Formula 1]

$$R = \frac{L_e}{\tan\frac{\theta}{2}} \quad (1)$$

This can generate a reachable path that combines a straight line and an arc.

Figure 13:
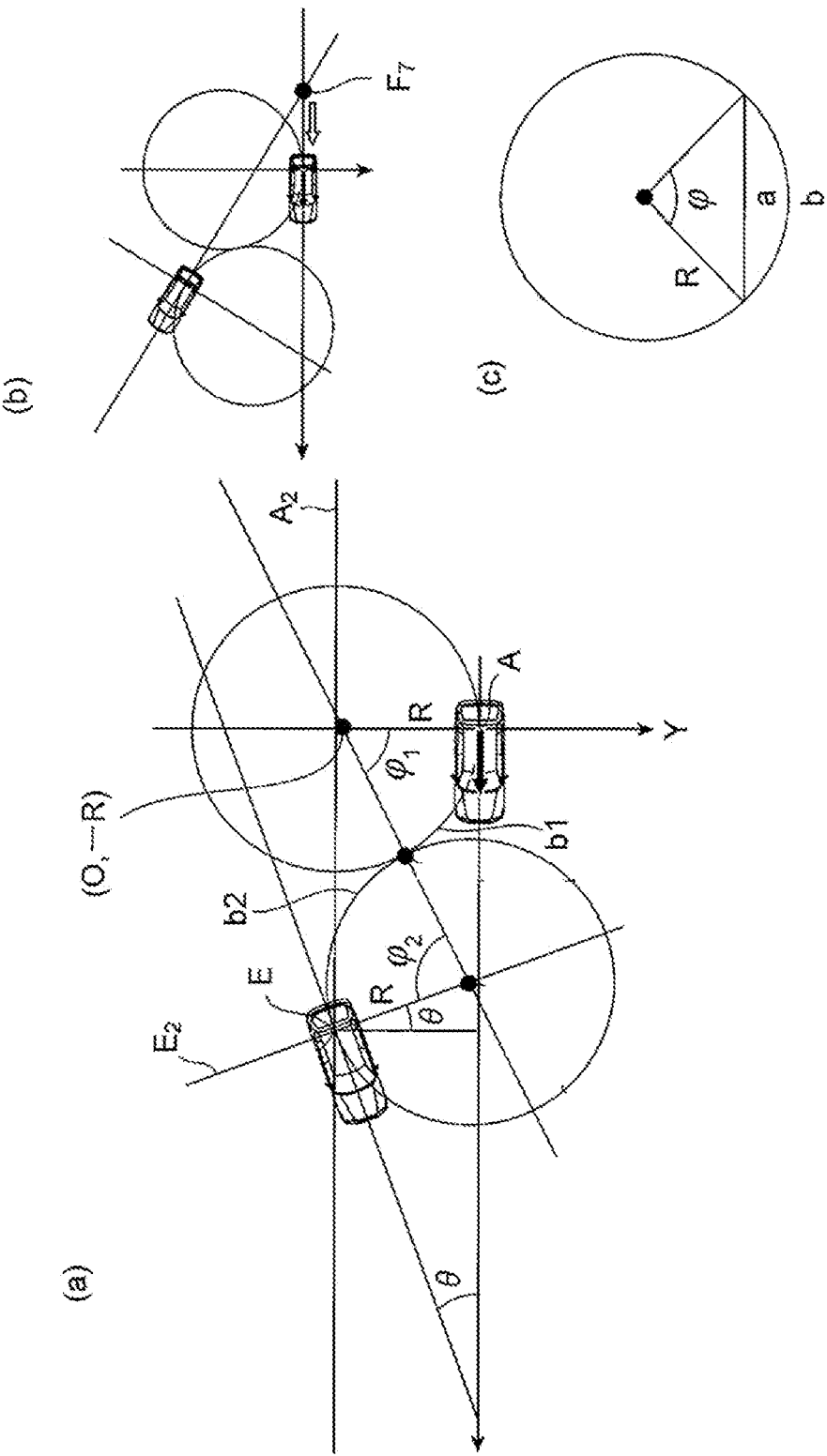
FIG. 13 illustrate a method of generating a reachable path that requires an S-turn steering maneuver.

FIG. 13 illustrate a method of generating a reachable path that requires an S-turn steering maneuver, and illustrate a generation method when the axis E2 does not intersect the X-axis, which is the axis A2 at the current position A, at a position behind the candidate connection position E.

Herein, the radii R, which are identical, of the two turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, such that one is $(O, -R)$ and the other is $X_e - R \sin\theta$, $Y_e + R\cos\theta$, the radius of each of the two circles can be determined from the distance between the center coordinates. Additionally, coordinates of the point of tangency between the two circles can be defined as $m(X_m, Y_m) = ((X_e - R\sin\theta)/2, (Y_e + R\cos\theta - R)/2)$.

[Formula 2]

$$2R = \sqrt{(X_e - R\sin\theta)^2 + (Y_e + R\cos\theta + R)^2} \quad (2)$$

[Formula 3]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (3)$$

It should be noted that when $\theta = 0$,

[Formula 4]

$$R = \frac{X_e^2 + Y_e^2}{4Y_e} \quad (4)$$

The position of the intersection illustrated in FIG. 13(a) to the position of the intersection F7 illustrated in FIG. 13(b) can be computed from the aforementioned computational formulae. From the formulae as shown in FIG. 13(c), a length of chord is defined by a=2R sin(φ/2) and the length of an arc is defined by b=R φ. By using these formulas, the turning angles φ$_1$ and φ$_2$ and the arc lengths b$_1$ and b$_2$ of the two circle of the S-shape be determined using the following computational formulae.

[Formula 5]

$$\varphi_1 = 2\sin^{-1}\left(\frac{\sqrt{X_m^2 + Y_m^2}}{2R}\right) \quad (5)$$

[Formula 6]

$$b_1 = 2R\sin^{-1}\left(\frac{\sqrt{X_m^2 + Y_m^2}}{2R}\right) \quad (6)$$

[Formula 7]

$$\varphi_2 = 2\sin^{-1}\left(\frac{\sqrt{(X_m - X_e)^2 + (Y_m - Y_e)^2}}{2R}\right) \quad (7)$$

[Formula 8]

$$b_2 = 2R\sin^{-1}\left(\frac{\sqrt{(X_m - X_e)^2 + (Y_m - Y_e)^2}}{2R}\right) \quad (8)$$

Figure 14:
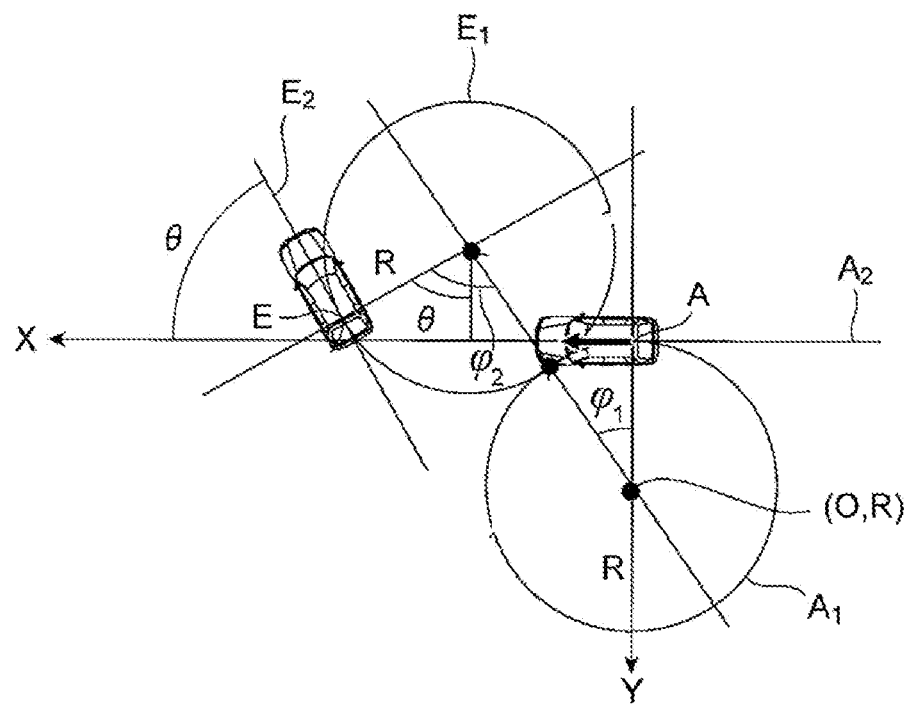
FIG. 14 illustrates a method of generating a reachable path that requires an S-turn steering maneuver.

FIG. 14 illustrates an example of a method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. The center coordinate for turn circle A1 being defined as (O, R) and the other is X$_e$+R sin θ, Y$_e$−R cos θ. Once the point of tangency between the two circles is determined, an S-shaped reachable path can be generated by combining the arc of the turning circle A1 and the arc of the turning circle E1. Since the center coordinates of the two circles can be determined, the radius of each of the two circles can be determined from the distance between the center coordinates. Further, coordinates of the point of tangency between the two circles can be defined as m(X$_m$, Y$_m$)=((X$_e$+R sin θ)/2, (Y$_e$−R cos θ+R)/2).

[Formula 9]

$$2R = \sqrt{(X_e + R\sin\theta)^2 + (Y_e - R\cos\theta + R)^2} \quad (9)$$

[Formula 10]

$$R = \frac{-\{X_e\sin\theta - Y_e(1 + \cos\theta)\} - \sqrt{\{X_e\sin\theta - Y_e(1 + \cos\theta)\}^2 - 2(\cos\theta - 1)(X_e^2 + Y_e^2)}}{2(\cos\theta - 1)} \quad (10)$$

From the formulae shown in FIG. 13(c), the turning angles φ$_1$ and φ$_2$ and the arc lengths b$_1$ and b$_2$ of the two circles of the S-shape can be determined using the following computational formulae.

[Formula 11]

$$\varphi_1 = 2\sin^{-1}\left(\frac{\sqrt{X_m^2 + Y_m^2}}{2R}\right) \quad (11)$$

[Formula 12]

$$b_1 = 2R\sin^{-1}\left(\frac{\sqrt{X_m^2 + Y_m^2}}{2R}\right) \quad (12)$$

[Formula 13]

$$\varphi_2 = 2\sin^{-1}\left(\frac{\sqrt{(X_m - X_e)^2 + (Y_m - Y_e)^2}}{2R}\right) \quad (13)$$

[Formula 14]

$$b_2 = 2R\sin^{-1}\left(\frac{\sqrt{(X_m - X_e)^2 + (Y_m - Y_e)^2}}{2R}\right) \quad (14)$$

Figure 15:
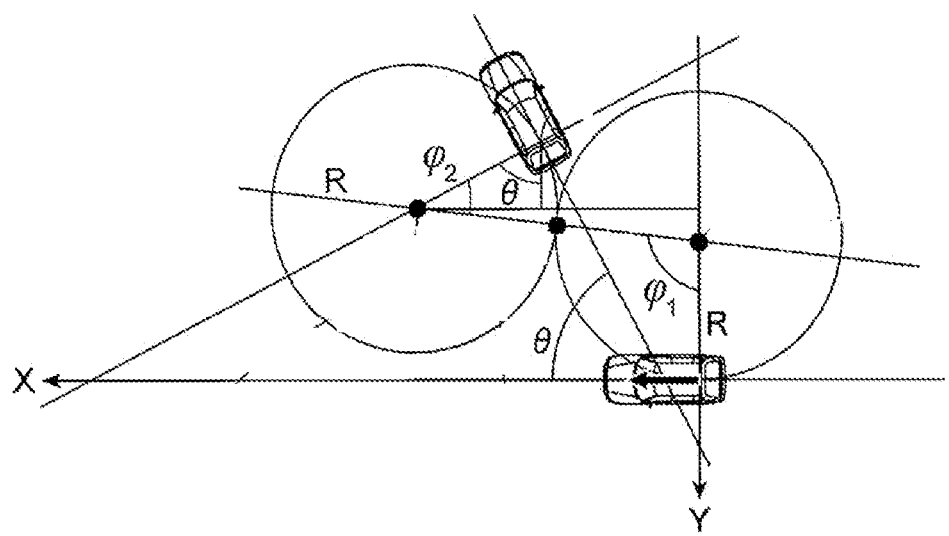
FIG. 15 illustrates a method of generating a reachable path that requires an S-turn steering maneuver.

FIG. 15 illustrates a method of generating a reachable path that requires an S-turn steering maneuver, and illustrates a generation method when the axis E2 intersects the X-axis, which is the axis A2 at the current position A, at a position behind the candidate connection position E.

Herein, the radii R, which are identical, of the turning circles E1 and A1 for depicting an S-shape are computed. Once the point of tangency between the two circles is determined, an S-shaped reachable path can be generated by combining the arc of the turning circle A1 and the arc of the turning circle E1.

Since the center coordinates of the two circles can be determined, such that one is (O, −R) and the other is X$_e$−R sin θ, Y$_e$+R cos θ, the radius of each of the two circles can be determined from the distance between the center coordinates. Additionally, coordinates of the point of tangency between the two circles can be defined as m(X$_m$, Y$_m$)= ((X$_e$−R sin θ)/2, (Y$_e$+R cos θ−R)/2).

[Formula 15]

$$2R = \sqrt{(X_e - R\sin\theta)^2 + (Y_e + R\cos\theta + R)^2} \quad (15)$$

[Formula 16]

$$R = \frac{X_e\sin\theta - Y_e(1 + \cos\theta) - \sqrt{\{X_e\sin\theta - Y_e(1 + \cos\theta)\}^2 - 2(\cos\theta - 1)(X_e^2 + Y_e^2)}}{2(\cos\theta - 1)} \quad (16)$$

From the formulae shown in FIG. 13(c), the turning angles φ$_1$ and φ$_2$ and the arc lengths b$_1$ and b$_2$ of the two circles of the S-shape can be determined using the following computational formulae.

[Formula 17]

$$\varphi_1 = 2\sin^{-1}\left(\frac{\sqrt{X_m^2 + Y_m^2}}{2R}\right) \quad (17)$$

[Formula 18]

$$b_1 = 2R\sin^{-1}\left(\frac{\sqrt{X_m^2 + Y_m^2}}{2R}\right) \quad (18)$$

-continued

[Formula 19]

$$\varphi_2 = 2\sin^{-1}\left(\frac{\sqrt{(X_m - X_e)^2 + (Y_m - Y_e)^2}}{2R}\right) \quad (19)$$

[Formula 20]

$$b_2 = 2R\sin^{-1}\left(\frac{\sqrt{(X_m - X_e)^2 + (Y_m - Y_e)^2}}{2R}\right) \quad (20)$$

<Parking Path Setting Unit>

The parking path setting unit 14 sets a parking path using information on the pull-out path of from the target parking position P1 to the park-out position P2 and information on the reachable path of from the initial position P0 of the vehicle V to the park-out position P2. The parking path setting unit 14 forms a parking path by connecting the reachable path, which has been generated by setting the connection OK flag ON in step S117 of FIG. 10, and the pull-out path including the park-out position P2 connecting to the reachable path.

When it is possible to set a plurality of parking paths, a parking path is selected according to various evaluation values, such as a parking time, the presence or absence of a vehicle behind, the accuracy of parking, the width of a road, and a preference of a driver. For example, the accuracy of parking is higher when the vehicle V moves straight into a parking space after the orientation of the vehicle V has been aligned with the parking orientation than when the vehicle enters the parking space while turning. Therefore, when the accuracy of parking is prioritized, a parking path is selected that allows the vehicle V to move straight into a parking space after the orientation of the vehicle V has been aligned with the parking orientation.

In addition, when the vehicle V is parked into a parking space from the park-out position P2, for example, the time needed for parking can be shortened as the number of switching of the direction of vehicle travel between forward drive and reverse drive as well as the number of steering maneuvers is smaller. Therefore, to shorten the time needed for parking, a parking path is selected that requires a less number of switching of the direction of vehicle travel between forward drive and reverse drive as well as less steering maneuvers as much as possible.

Further, the driver's intention to park the vehicle V in a parking space can be more clearly conveyed to another vehicle behind the vehicle V when the vehicle V is at a position closer to the parking space than when the vehicle V moves to a position away from the parking space, for example. Therefore, when there is another vehicle behind the vehicle V on the road, a parking path is selected that allows the vehicle V to be closer to the parking space.

FIGS. 5B, 6B, 7B, and 8B each illustrate a parking path obtained by connecting the pull-out path and the reachable path via the park-out position P2 selected from among the plurality of candidate connection positions Pn illustrated in FIGS. 5A, 6A, 7A, and 8A.

Figure 5B:
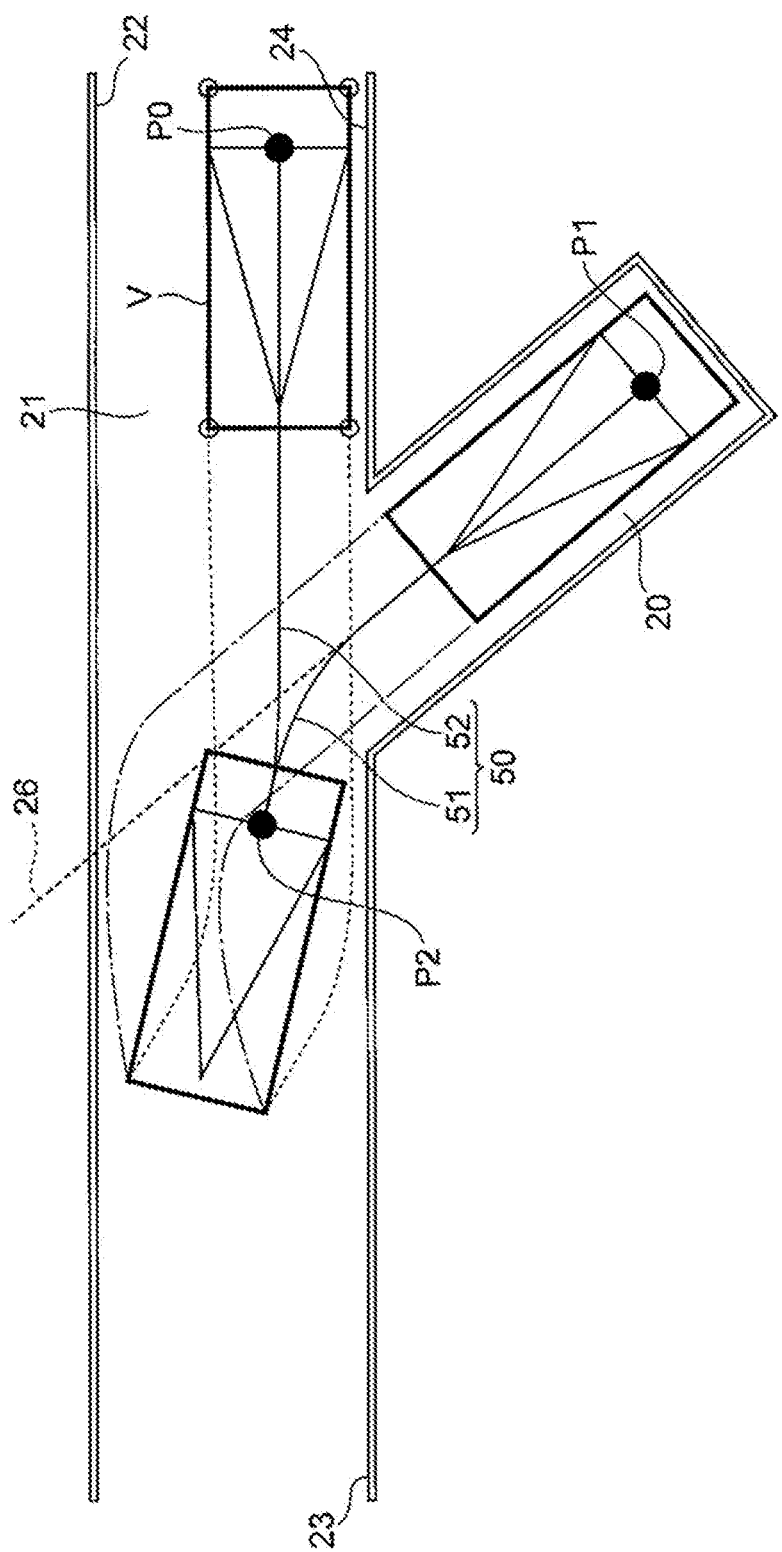
FIG. 5B is a schematic diagram illustrating a parking path obtained by connecting a pull-out path and a reachable path via a park-out position selected from among the plurality of candidate connection positions illustrated in FIG. 5A.
Figure 6A:
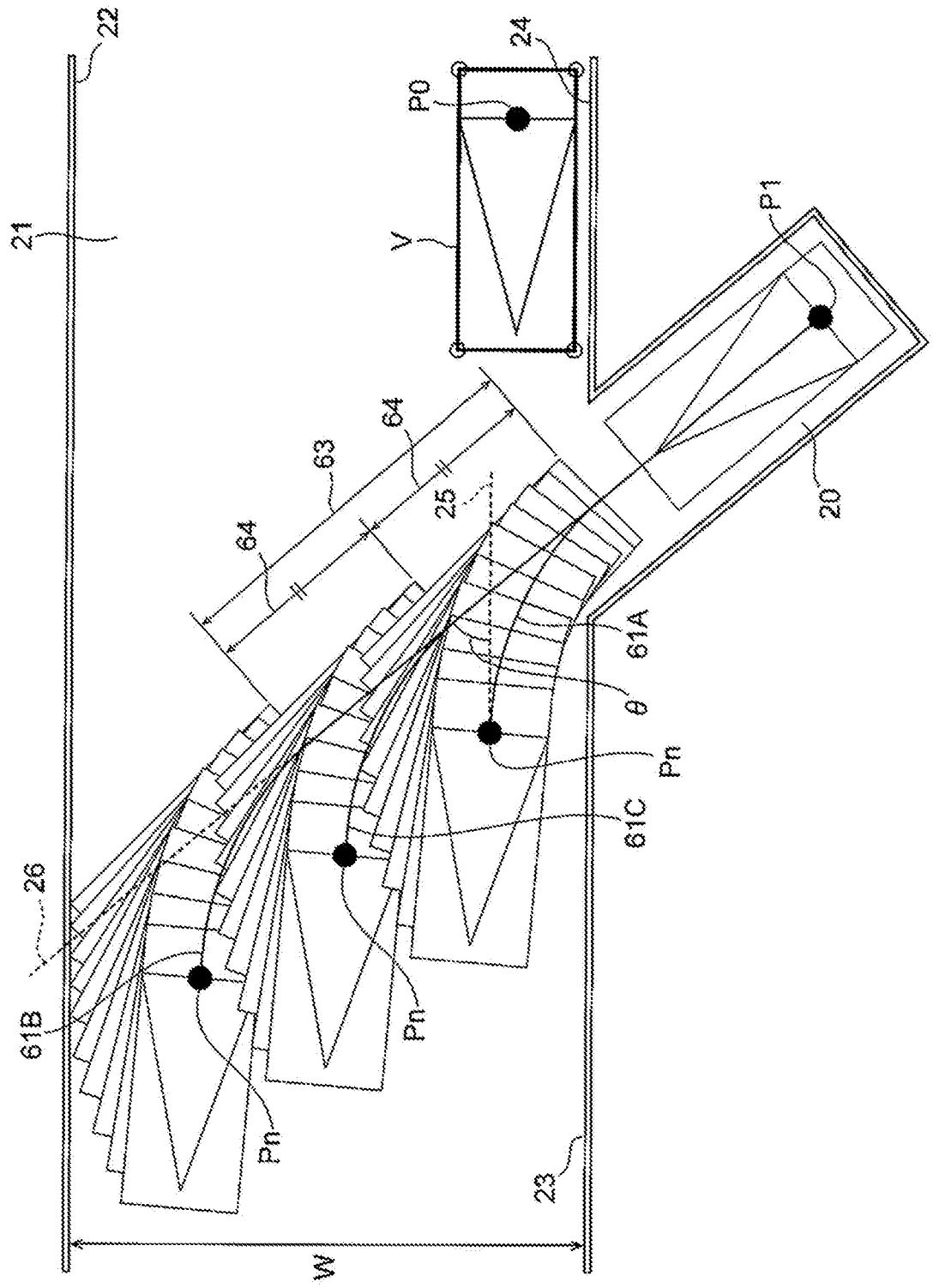
FIG. 6A is a schematic diagram illustrating a pull-out path for back-in angle parking and candidate connection positions thereon.

The parking path 50 is formed by connecting the pull-out path 51 and the reachable path 52 via the park-out position P2 as illustrated in FIG. 5B. The parking path 50 is a path for backing up the vehicle V into the parking space 20 from the park-out position P2 while turning the vehicle V. When the parking path 50 is used, the vehicle V can be smoothly moved to the target parking position P1 from the park-out position P2 that is not that far from the parking space 20. Thus, the time needed for parking can be shortened.

The parking path 60 is formed by connecting the pull-out path 61 and the reachable path 62 via the park-out position P2 as illustrated in FIG. 6B. The parking path 60 is a path for allowing the orientation of the vehicle V to substantially coincide with the parking orientation 26 at the park-out position P2. Thus, when the parking path 60 is used, the vehicle V is allowed to enter the parking space 20 only by backing up substantially straight from the park-out position P2, and thus can be parked at the target parking position P1 with high accuracy.

The parking path 70 is formed by connecting the pull-out path 71 and the reachable path 72 via the park-out position P2 as illustrated in FIG. 7B. The pull-out path 71 includes a reachable limit position P3 between the target parking position P1 and the park-out position P2. In addition, the orientation of the vehicle V at the park-out position P2 is set such that it becomes parallel with the road orientation of the road 31, and the reachable path 72 has a gentle S-shape. Thus, the vehicle V can be smoothly parked at the target parking position P1 without giving passengers of the vehicle V a feeling of discomfort.

The parking path 80 is formed by connecting the pull-out path 81 and the reachable path 82 via the park-out position P2 as illustrated in FIG. 8B. The pull-out path 81 includes the reachable limit position P3 between the target parking position P and the park-out position P2. In addition, the pull-out path 81 is a path for backing up the vehicle V substantially straight from the park-out position P2 to the reachable limit position P3. Thus, errors that may occur when the vehicle V is moving along the path can be reduced, and thus, the vehicle V can be parked at the target parking position P1 with high accuracy.

According to the present invention, a pull-out path is computed from the target parking position B. and among a plurality of candidate connection positions set on the pull-out path, a candidate connection position that can be reached by the vehicle at the current position A and is closest to the vehicle is selected as the candidate connection position E. Then, a parking path is set using the pull-out path of from the target parking position B to the candidate connection position E and a reachable path of from the current position A of the vehicle to the candidate connection position E. Therefore, a parking path that includes switching of the direction of vehicle travel for guiding the vehicle V to the target parking position B is computed independently of the start position or vehicle attitude when parking assistance is started, and the vehicle V can be parked at the position intended by the driver and in a correct vehicle attitude.

Although the embodiments of the present invention have been described in detail above, the present invention is not limited thereto, and various design changes can be made without departing from the spirit or scope of the present invention recited in the claims. For example, although the aforementioned embodiments have been described in detail to clearly illustrate the present invention, the present invention need not include all of the configurations described in the embodiments. It is possible to replace a part of a configuration of an embodiment with a configuration of another embodiment. In addition, it is also possible to add, to a configuration of an embodiment, a configuration of another embodiment. Further, it is also possible to, for a part of a configuration of each embodiment, add, remove, or substitute a configuration of another embodiment.

REFERENCE SIGNS LIST

1 Parking assistance device
11 Pull-out path computing unit
12 Candidate connection position setting unit
13 Reachable path computing unit 14 Parking path setting unit
15 Operation input unit
16 Path display unit
20 Parking space
21, 31 Road
22, 23, 24, 32, 33, 34 Obstacle
25, 35 Road orientation
26, 36 Parking orientation
V Vehicle
Vo Reference point
P0 Initial position
P1 Target parking position
P2 Park-out position
Pn Candidate connection position

The invention claimed is:

1. A parking assistance device for assisting in parking a vehicle in a parking space, comprising:
 a pull-out path computing unit configured to compute a pull-out path for pulling the vehicle out of the parking space on the basis of information on the parking space and constraint conditions regarding vehicle behavior;
 a candidate connection position setting unit configured to set a plurality of candidate connection positions on the pull-out path computed by the pull-out path computing unit;
 a reachable path computing unit configured to compute a reachable path that enables the vehicle to reach one of the plurality of candidate connection positions from a current position of the vehicle; and
 a parking path setting unit configured to set a parking path by connecting the pull-out path and the reachable path,
 wherein the pull-out path computing unit is configured to:
  when parking assisted is angle parking in which the vehicle is parked in the parking space that is arranged diagonally with respect to a road from the road, compute the pull-out path on the basis of an angle of inclination between a road orientation of the road and a parking orientation of the parking space, determine whether the parking direction of the vehicle in the parking space is a backward angle parking direction or a forward angle parking direction based on an inclination angle between a road orientation of the road and a parking orientation of the parking space,
  on a condition that the parking direction is the backward angle parking direction, compute the pull-out path such that the vehicle will exit the parking space in a same direction as an orientation of the vehicle at an initial position, and
  on a condition that the parking direction is the forward angle parking direction, compute the pull-out path such that the vehicle will exit the parking space in an opposite direction as the orientation of the vehicle at the initial position.

2. The parking assistance device according to claim 1, wherein the pull-out path computing unit is configured to compute the pull-out path until a distance of the vehicle from the target parking position is equal to a predetermined distance.

3. The parking assistance device according to claim 1, wherein the pull-out path computing unit is configured to compute the pull-out path until a number of times of changing direction of the vehicle is equal to a predetermined amount.

4. The parking assistance device according to claim 1, wherein the pull-out path computing unit is configured to compute the pull-out path until an angle of an orientation of the vehicle on the pull-out path with respect to the parking orientation of the parking space becomes greater than or equal to the angle of inclination.

5. The parking assistance device according to claim 4, wherein the candidate connection position setting unit is configured to, when the vehicle is moved in a direction to leave the parking space along the pull-out path, set as the candidate connection position a position at which the orientation of the vehicle has changed by a predetermined relative angle each time.

* * * * *